United States Patent
Yamagishi et al.

(10) Patent No.: US 12,517,420 B2
(45) Date of Patent: Jan. 6, 2026

(54) PROJECTION DISPLAY APPARATUS

(71) Applicant: Panasonic Intellectual Property Management Co., Ltd., Osaka (JP)

(72) Inventors: Shigekazu Yamagishi, Osaka (JP); Toshihiko Matsuda, Osaka (JP); Shu Namba, Osaka (JP)

(73) Assignee: PANASONIC PROJECTOR DISPLAY CORPORATION, Osaka (JP)

( * ) Notice: Subject to any disclaimer, the term of this patent is extended or adjusted under 35 U.S.C. 154(b) by 522 days.

(21) Appl. No.: 17/979,276

(22) Filed: Nov. 2, 2022

(65) Prior Publication Data

US 2023/0046063 A1 Feb. 16, 2023

Related U.S. Application Data

(63) Continuation of application No. PCT/JP2021/025567, filed on Jul. 7, 2021.

(30) Foreign Application Priority Data

Aug. 6, 2020 (JP) .................. 2020-133745

(51) Int. Cl.
*G03B 21/16* (2006.01)
*G02B 5/04* (2006.01)
(Continued)

(52) U.S. Cl.
CPC ............. *G03B 21/16* (2013.01); *G02B 5/04* (2013.01); *G03B 21/008* (2013.01); *H05K 7/20263* (2013.01); *H05K 7/20272* (2013.01)

(58) Field of Classification Search
CPC ...... G03B 21/16; G03B 21/008; G03B 21/00; G03B 21/005; G03B 21/28; G03B 21/204;
(Continued)

(56) References Cited

U.S. PATENT DOCUMENTS

2002/0163625 A1* 11/2002 Tabuchi ............... H04N 9/3144
                                                         348/E5.142
2004/0257538 A1    12/2004 Kondo et al.
(Continued)

FOREIGN PATENT DOCUMENTS

EP    1315028    5/2003
JP    8-195457   7/1996
(Continued)

OTHER PUBLICATIONS

International Search Report issued Sep. 21, 2021 in corresponding International Application No. PCT/JP2021/025567.
(Continued)

*Primary Examiner* — Magda Cruz
(74) *Attorney, Agent, or Firm* — Wenderoth, Lind & Ponack, L.L.P.

(57) ABSTRACT

A cooling device of a projection display apparatus includes a first heat receiving unit including an opening that is rectangular. The first heat receiving unit includes a flow path part that forms the opening. An image display element of the projection display apparatus includes a first front face located in front of a reflective image display, a second front face parallel to the first front face and located behind and outside the first front face, and a first side face located between the first front face and the second front face. The first front face is inserted into the opening, and the flow path part is in contact with the first side face and the second front face via a heat conductive member. The flow path part includes a front face that is flush with or in front of the first front face of the image display element.

22 Claims, 24 Drawing Sheets

(51) Int. Cl.
*G03B 21/00* (2006.01)
*H05K 7/20* (2006.01)

(58) Field of Classification Search
CPC .......... G03B 33/12; G02B 5/04; G02B 7/008;
G02B 27/1026; G02B 26/008; G02B
27/0927; H05K 7/20263; H05K 7/20272;
H04N 5/74
USPC ............................................................ 353/52
See application file for complete search history.

(56) References Cited

U.S. PATENT DOCUMENTS

| | | |
|---|---|---|
| 2005/0122482 A1 | 6/2005 | Ellis et al. |
| 2005/0213018 A1 | 9/2005 | Hoshino et al. |
| 2005/0213227 A1* | 9/2005 | Fujimori ............... G02B 27/149 359/820 |
| 2005/0220156 A1* | 10/2005 | Kitabayashi ...... G02F 1/133385 349/5 |
| 2007/0008497 A1 | 1/2007 | Ellis et al. |
| 2016/0349605 A1 | 12/2016 | Kitade |
| 2017/0277026 A1 | 9/2017 | Ikeo |
| 2018/0149952 A1 | 5/2018 | Matsumoto et al. |
| 2019/0129237 A1* | 5/2019 | Nishi .................... G03B 21/16 |
| 2019/0353993 A1 | 11/2019 | Ikeo |
| 2020/0041882 A1 | 2/2020 | Wake et al. |
| 2020/0218141 A1 | 7/2020 | Van Rafelghem |

FOREIGN PATENT DOCUMENTS

| | | |
|---|---|---|
| JP | 2003-337380 | 11/2003 |
| JP | 2005-10630 | 1/2005 |
| JP | 2005-249950 | 9/2005 |
| JP | 2005-275189 | 10/2005 |
| JP | 2005-284138 | 10/2005 |
| JP | 2007-127856 | 5/2007 |
| JP | 2008-217041 | 9/2008 |
| JP | 2008-304833 | 12/2008 |
| JP | 4958378 | 6/2012 |
| JP | 2017-182047 | 10/2017 |
| JP | 2018-84726 | 5/2018 |
| JP | 2018-107187 | 7/2018 |
| JP | 2020-16749 | 1/2020 |
| WO | 02/19027 | 3/2002 |
| WO | 2005/017615 | 2/2005 |
| WO | 2016/147226 | 9/2016 |
| WO | 2018/159536 | 9/2018 |

OTHER PUBLICATIONS

Extended European Search Report issued Jan. 5, 2024 in related European Patent Application No. 21853280.2.
Office Action issued Aug. 5, 2025 in corresponding Japanese Patent Application No. 2024-167508, with English translation.

* cited by examiner

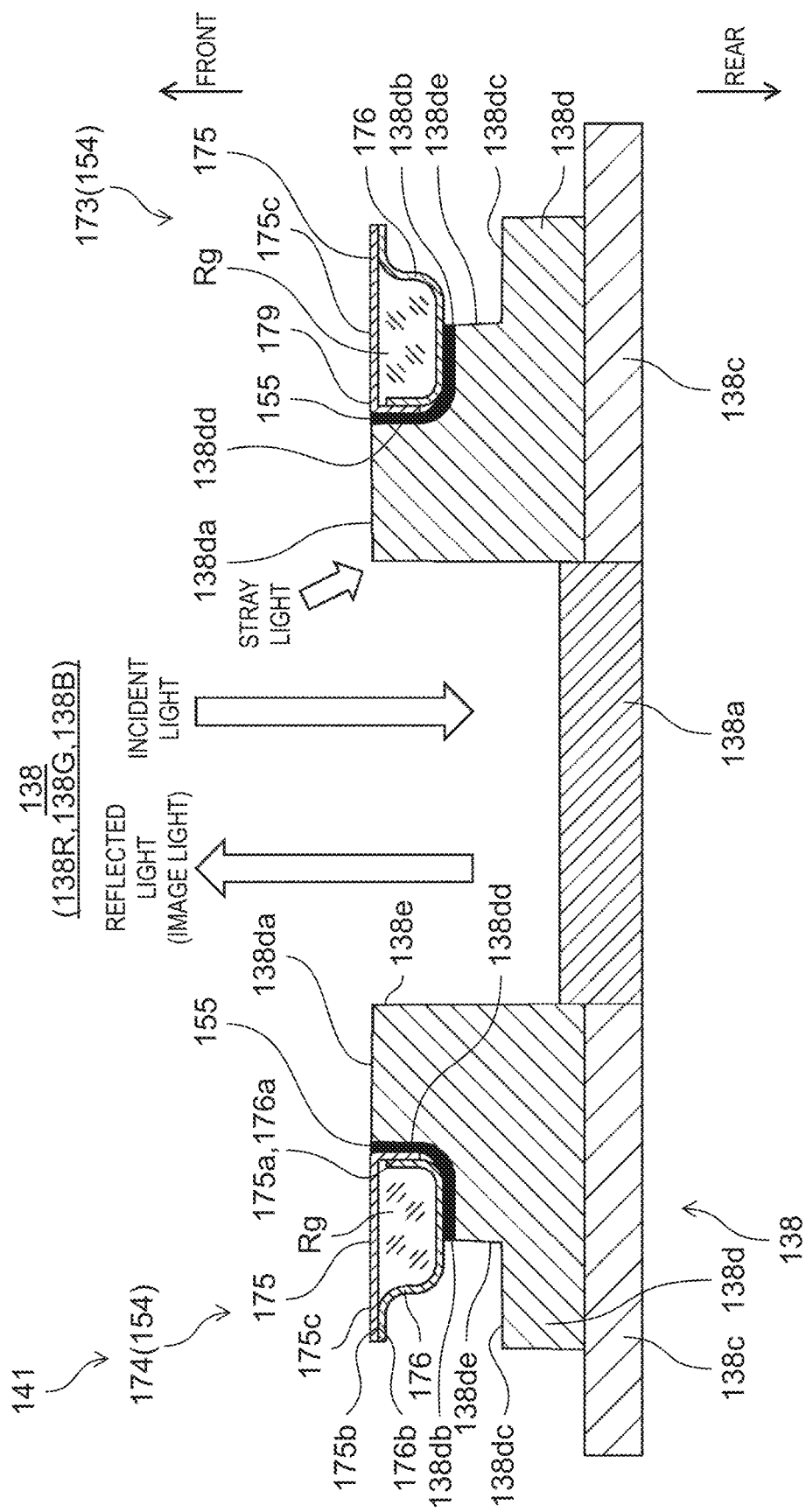

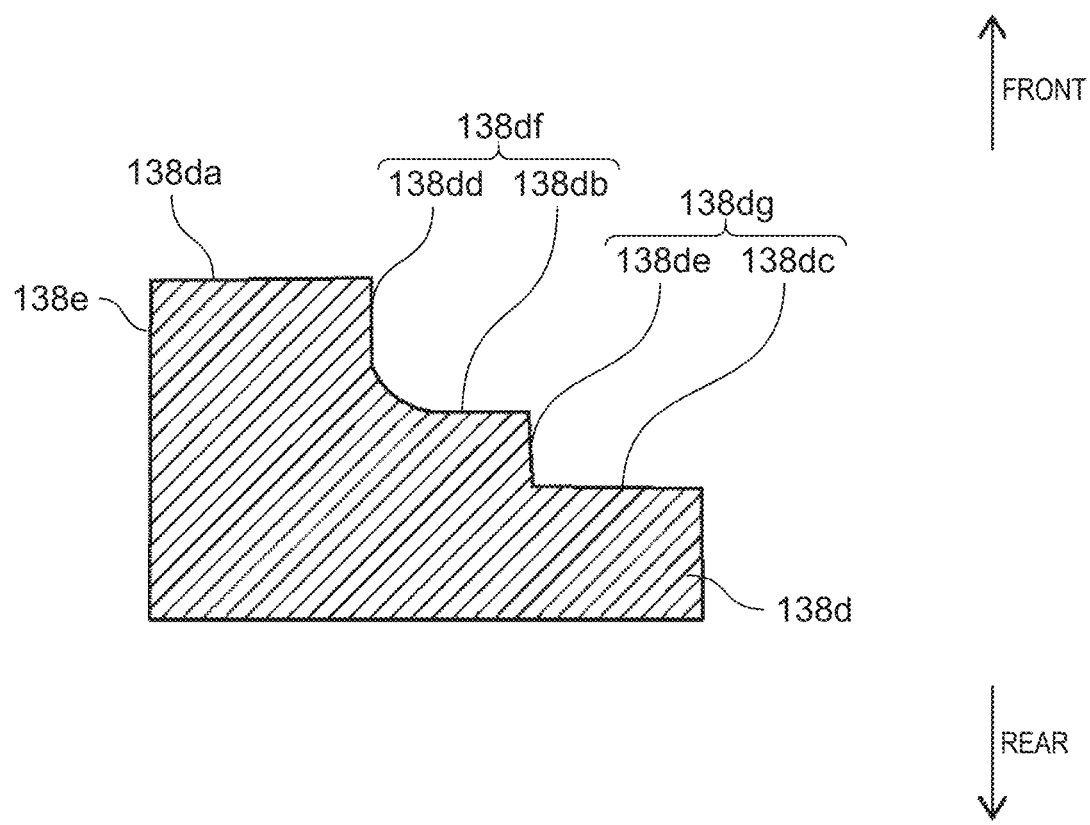

PROJECTION DISPLAY APPARATUS

BACKGROUND

1. Technical Field

The present disclosure relates to a projection display apparatus using an image display element, and more particularly to a configuration of a cooling device for an image display element.

2. Description of the Related Art

Conventionally, a reflective image display may be used as an image display element of a projection display apparatus. An example of the reflective image display is a digital mirror device (DMD). Since the DMD is made of an inorganic material and has high reliability, the DMD is also often used in ultrahigh-luminance projection image display elements. However, in order to maintain high reliability of the reflective image display such as the DMD, it is necessary to realize a temperature required in the image display element.

Cooling of the reflective image display is mainly performed by connecting a heat dissipating means such as a heat sink or a liquid cooling device to a back surface. In addition, a material having excellent thermal conductivity such as a copper plate, a connection of a heat pipe, or a liquid cooling device may be provided on a light incident side (front face side) of the reflective image display.

For example, Patent Literature (PTL) 1 and PTL 2 disclose a structure in which a refrigerant of air or liquid is caused to flow through a gap between a prism and a DMD to cool the DMD.

PTL 1 is WO 2005/017615 A, and PTL 2 is JP 4958378 B2.

SUMMARY

However, the cooling on the light incident side of the reflective image display cannot achieve sufficient cooling performance because a distance to an optical member, for example, a prism, disposed on a front face of the reflective image display is short. In the structure of PTL 1, dust cannot be prevented from adhering to an optical path effective area of an image display, and heat conduction efficiency is limited when a refrigerant is air, and thus the structure is limited to a projection display apparatus having a low light output.

In the structure of PTL 2, a pipe tube through which a refrigerant that is liquid flows is disposed between the image display and the prism that is a part of a projection optical system. Cooling efficiency is improved by using liquid as the refrigerant instead of air. However, it is required to increase a light amount from a light source in order to increase the luminance of a projected image, and it is necessary to improve the cooling efficiency of the image display.

An object of the present disclosure is to provide a projection display apparatus including a cooling device with improved cooling efficiency.

A projection display apparatus of the present disclosure includes: a light source unit that emits light; an image display element including a reflective image display that modulates the light from the light source unit according to an external signal; a cooling device that cools the image display element; and a projection lens unit that enlarges and projects an image generated by the light modulated by the image display element. The cooling device includes a first heat receiving unit including an opening that is rectangular, a pump that feeds a refrigerant that is liquid to the first heat receiving unit, and a heat dissipation part that dissipates heat received by the refrigerant. The first heat receiving unit includes a first inflow pipe into which the refrigerant flows, a first outflow pipe through which the refrigerant flows out, and a flow path part that forms the opening and connects the first inflow pipe and the first outflow pipe. The image display element includes a first front face located in front of the reflective image display, a second front face parallel to the first front face and located behind and outside the first front face, and a first side face located between the first front face and the second front face. The first front face of the image display element is inserted into the opening of the first heat receiving unit, the flow path part of the first heat receiving unit is in contact with the first side face and the second front face of the image display element via a heat conductive member, and the flow path part of the first heat receiving unit includes a front face that is flush with or in front of the first front face of the image display element.

The projection display apparatus of the present disclosure can provide a projection display apparatus including a cooling device with improved cooling efficiency.

BRIEF DESCRIPTION OF THE DRAWINGS

FIG. 10A is a cross-sectional view of the image display element and the first heat receiving unit according to the first exemplary embodiment.

FIG. 10B is a partial cross-sectional view of a protruding part of the image display element in FIG. 10A.

DETAILED DESCRIPTION

Hereinafter, exemplary embodiments will be described in detail with reference to the drawings as appropriate. However, unnecessarily detailed description may be omitted. For example, the detailed description of already well-known matters and the overlap description of substantially the same configurations may be omitted. This is to avoid an unnecessarily redundant description below and to facilitate understanding by those skilled in the art.

Note that the inventors of the present disclosure provide the accompanying drawings and the following description for those skilled in the art to fully understand the present disclosure, and do not provide them to intend to limit the subject matter described in the scope of claims.

First Exemplary Embodiment

A first exemplary embodiment will be described below with reference to FIGS. 1 to 5.

1. Configuration

[1-1. Overall Configuration]

Figure 1:
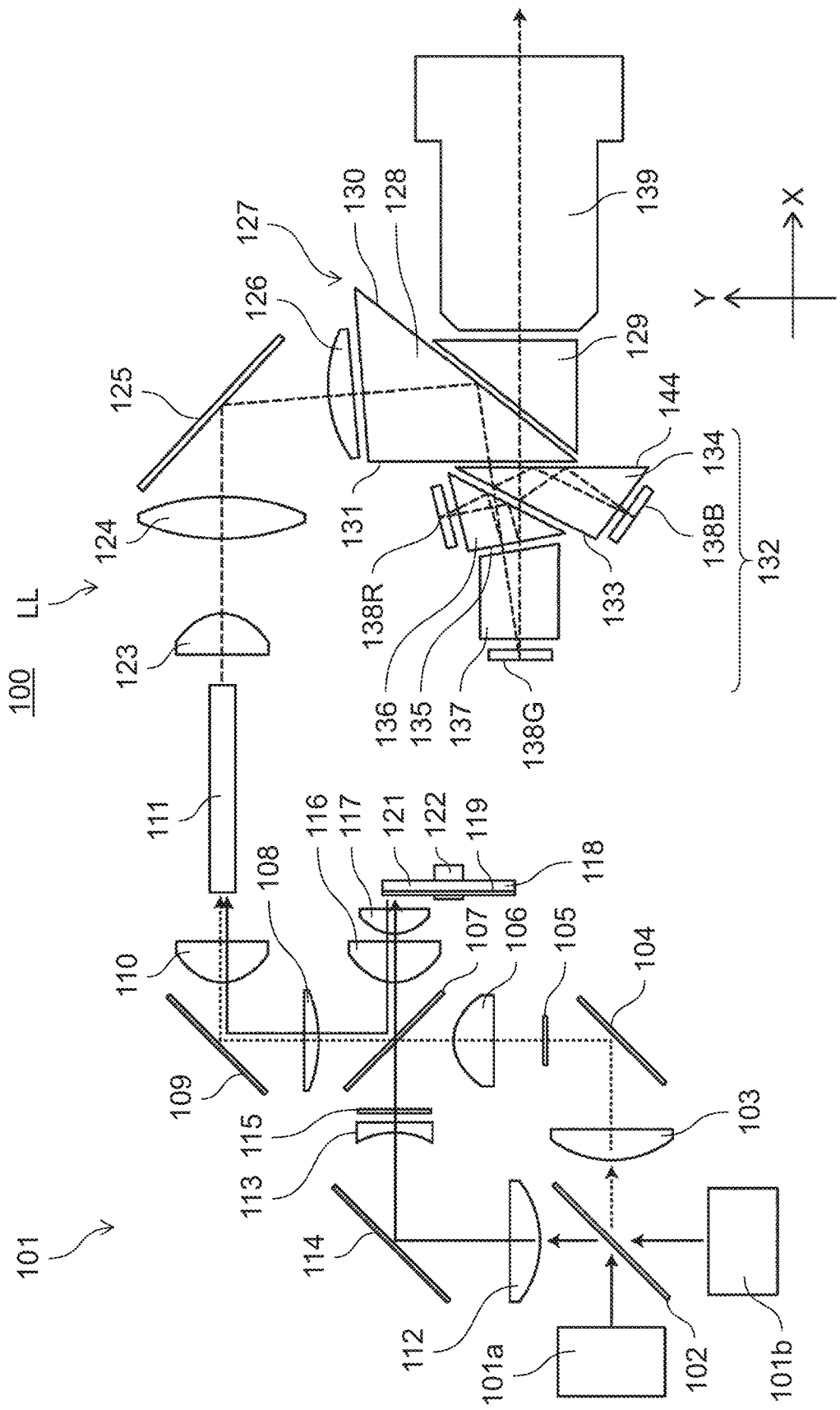
FIG. 1 is a configuration diagram of a projection display apparatus according to a first exemplary embodiment.

A schematic configuration of a projection display apparatus according to a first exemplary embodiment of the present disclosure will be described with reference to FIG. 1. FIG. 1 is a configuration diagram of a projection display apparatus according to a first exemplary embodiment. For convenience of the following description, an XY orthogonal coordinate system illustrated in the drawing is assumed in FIG. 1.

Projection display apparatus 100 includes light source unit 101, light guide optical system LL, prism unit 132, three image display elements 138R, 138G, 138B (collectively referred to as image display element 138), cooling device CL (see FIG. 5), and projection lens unit 139. Light source unit 101 emits light, and light guide optical system LL guides the light from light source unit 101 to image display elements 138R, 138G, 138B via prism unit 132. Prism unit 132 separates light from light source unit 101 into blue light, red light, and green light, and guides the light to image display elements 138R, 138G, 138B. Image display elements 138R, 138G, 138B modulate the separated light from light source unit 101 according to an external signal. Cooling device CL cools image display elements 138R, 138G, 138B. Projection lens unit 139 enlarges and projects an image generated by light modulated by image display elements 138R, 138G, 138B.

Light source unit 101 includes laser diode units 101a, 101b, mirrors 102, 104, 109, 114, lenses 103, 108, 110, 112, 113, diffuser plates 105, 115, condenser lenses 106, 116, 117, dichroic mirror 107, rod integrator 111, and phosphor wheel device 118.

Each of laser diode units 101a, 101b includes a plurality of light sources, and each of the light sources includes a pair of, for example, blue laser diodes and a collimating lens disposed on an emission side thereof. As a result, the light source can emit laser light with suppressed spread.

Light emitted from laser diode unit 101a is incident on mirror 102 having a partial opening. A part of the light incident on mirror 102 is emitted in a +X-direction through the partial opening of mirror 102, and the remaining light is reflected by a reflector in a +Y-direction.

Light emitted from laser diode unit 101b is also incident on mirror 102. When the light is incident on mirror 102, similarly, a part of the light passes through the partial opening of mirror 102 and is emitted in the +Y-direction, and the remaining light is reflected by the reflector in the +X-direction. Regarding ratios of the blue light to the light traveling in the +X-direction and to the light traveling in the +Y-direction among the emitted light from laser diode units 101a, 101b, the shape of the partial opening of mirror 102 is designed so that the ratio of the latter is high.

The blue light emitted in the +X-direction is condensed by lens 103, reflected by mirror 104, then condensed in the vicinity of diffuser plate 105, and diffused by diffuser plate 105. The diffused blue light enters condenser lens 106, becomes collimated light, and enters dichroic mirror 107. Dichroic mirror 107 has a characteristic of transmitting blue light and reflecting other color light. Therefore, the blue light incident on dichroic mirror 107 is transmitted through dichroic mirror 107. The transmitted blue light passes through lens 108, mirror 109, and lens 110, and is condensed on an incident surface of rod integrator 111 having a rectangular opening.

The light traveling in the +Y-direction via mirror 102 having a partial opening is converged by lens 112 and lens 113 constituting an afocal system with mirror 114 interposed therebetween and is incident on diffuser plate 115. The blue laser light incident on diffuser plate 115 is diffused here, and then passes through dichroic mirror 107 to be incident on condenser lenses 116, 117. The blue light incident thereon is incident on phosphor part 119 of phosphor wheel device 118.

Phosphor part 119 is, for example, a ceramic phosphor, and a reflection layer (not illustrated) that reflects light having a wavelength of fluorescent light is formed on a surface opposite to an incident surface of the excitation light. The reflection layer is fixed to spreader 121 having excellent thermal conductivity via an adhesive layer (not illustrated). Spreader 121 is a disk and is configured to be rotatable by motor 122 at the center.

The blue light incident on phosphor part 119 is converted into yellow light by entering phosphor part 119, reflected by the reflection layer on a back surface, and emitted toward condenser lens 117. The yellow light having passed through condenser lens 117 passes through condenser lens 116 and is incident on dichroic mirror 107. Here, the yellow light is reflected and condensed on the incident surface of rod integrator 111 having a rectangular opening through lens 108, mirror 109, and lens 110 similarly to the blue light. Inside rod integrator 111, the blue light of the laser light source and the yellow light of the fluorescent light are superimposed to generate white light.

As described above, light source unit 101 may have a configuration other than the above-described configuration as long as it is configured to emit white light.

Light guide optical system LL includes relay lenses 123, 124, mirror 125, field lens 126, and total reflection prism 127.

The light emitted from rod integrator 111 passes through relay lenses 123, 124 and is reflected by folding mirror 125. The totally reflected light passes through field lens 126 and enters total reflection prism 127. Total reflection prism 127 includes first prism 128 and second prism 129, and is fixed while maintaining a slight gap (air gap) between first prism 128 and second prism 129. The light incident on total reflection prism 127 is totally reflected by side face 130 of first prism 128, passes through side face 131 of first prism 128, and is incident on prism unit 132.

Prism unit 132 is formed by bonding and fixing first prism 134 having blue-transmitting dichroic mirror face 133 having a characteristic of reflecting blue light, second prism 136 having green-transmitting dichroic mirror face 135 having a characteristic of reflecting red light and blue light, and third prism 137. However, an air gap is provided between first prism 134 and second prism 136 in order to use total reflection.

Image display elements 138R, 138G, 138B are disposed to face end surfaces of first prism 134, second prism 136, and third prism 137, respectively. Image display element 138 includes reflective image display 138*a* (see FIG. 3) in which a plurality of minute mirrors are two-dimensionally arranged. Inclination directions of the minute mirrors are controlled in two directions in accordance with an image signal from the outside. Reflected light from the mirror at a tilt angle at the time of an ON signal returns to prism unit 132 at an incident angle of 0 degree, and is incident on prism unit 132 again at a large angle at the time of an OFF signal.

Image display element 138B is for blue light modulation, image display element 138R is for red light modulation, and image display element 138G is for green light modulation. At present, these image display elements in the market include device elements used as DMDs in projection display apparatuses.

In each pixel of image display elements 138R, 138G, 138B, the image in a white display mode returns to prism unit 132 again, passes through first prism 128 and second prism 129 of total reflection prism 127, enters projection lens unit 139, and reaches a screen not illustrated in the drawing. Thus, color display is achieved.

[1-2. Configuration of Main Part]

Figure 2:
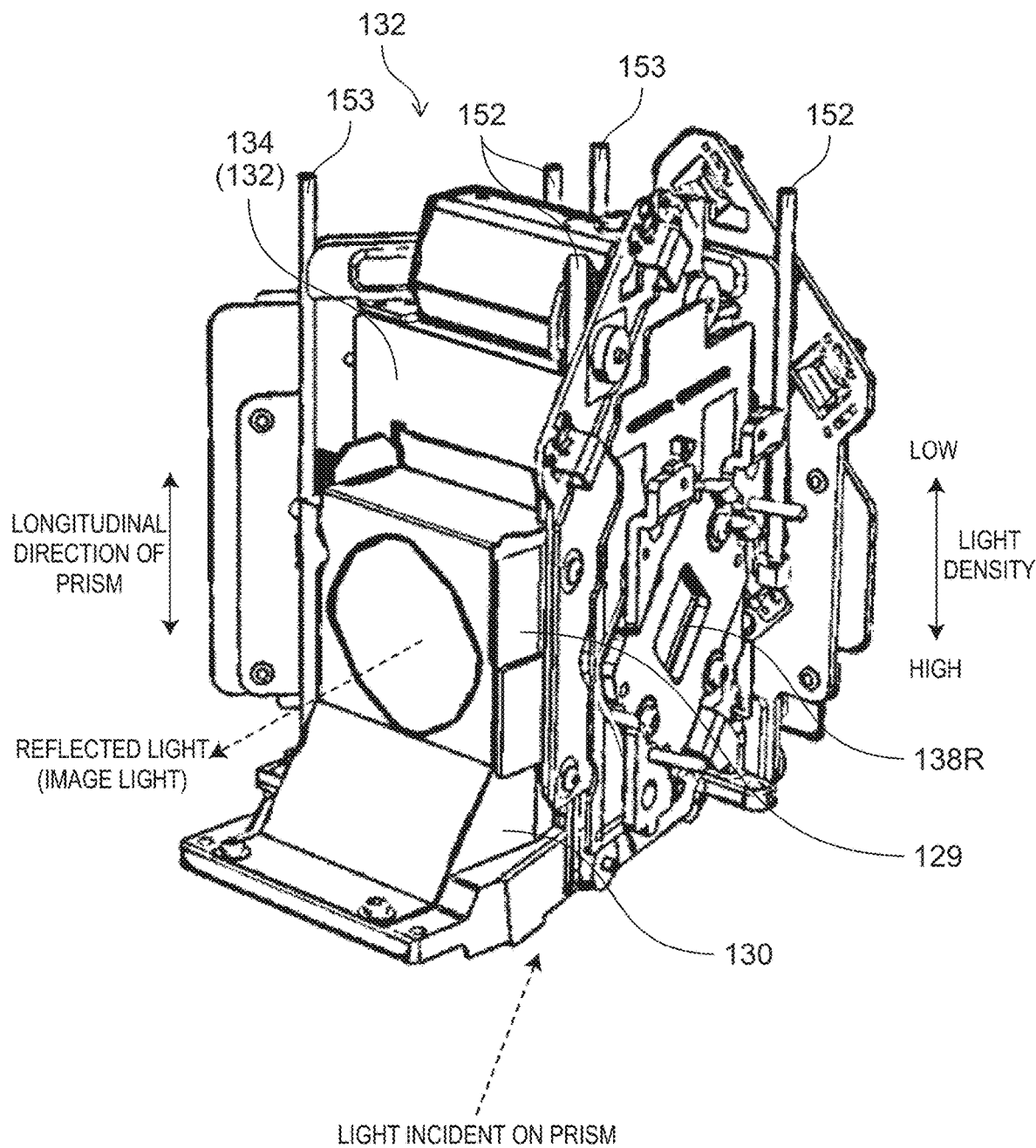
FIG. 2 is a peripheral configuration diagram of a prism unit of the first exemplary embodiment.

Next, the configuration of the main part will be described with reference to FIG. 2. FIG. 2 is a configuration diagram around prism unit 132. In FIG. 2, a second heat receiving unit is omitted for easy understanding of image display element 138R. Furthermore, in the configuration around image display element 138, a side of prism unit 132 is defined as the front, and an opposite direction thereof is defined as the rear.

Figure 3:
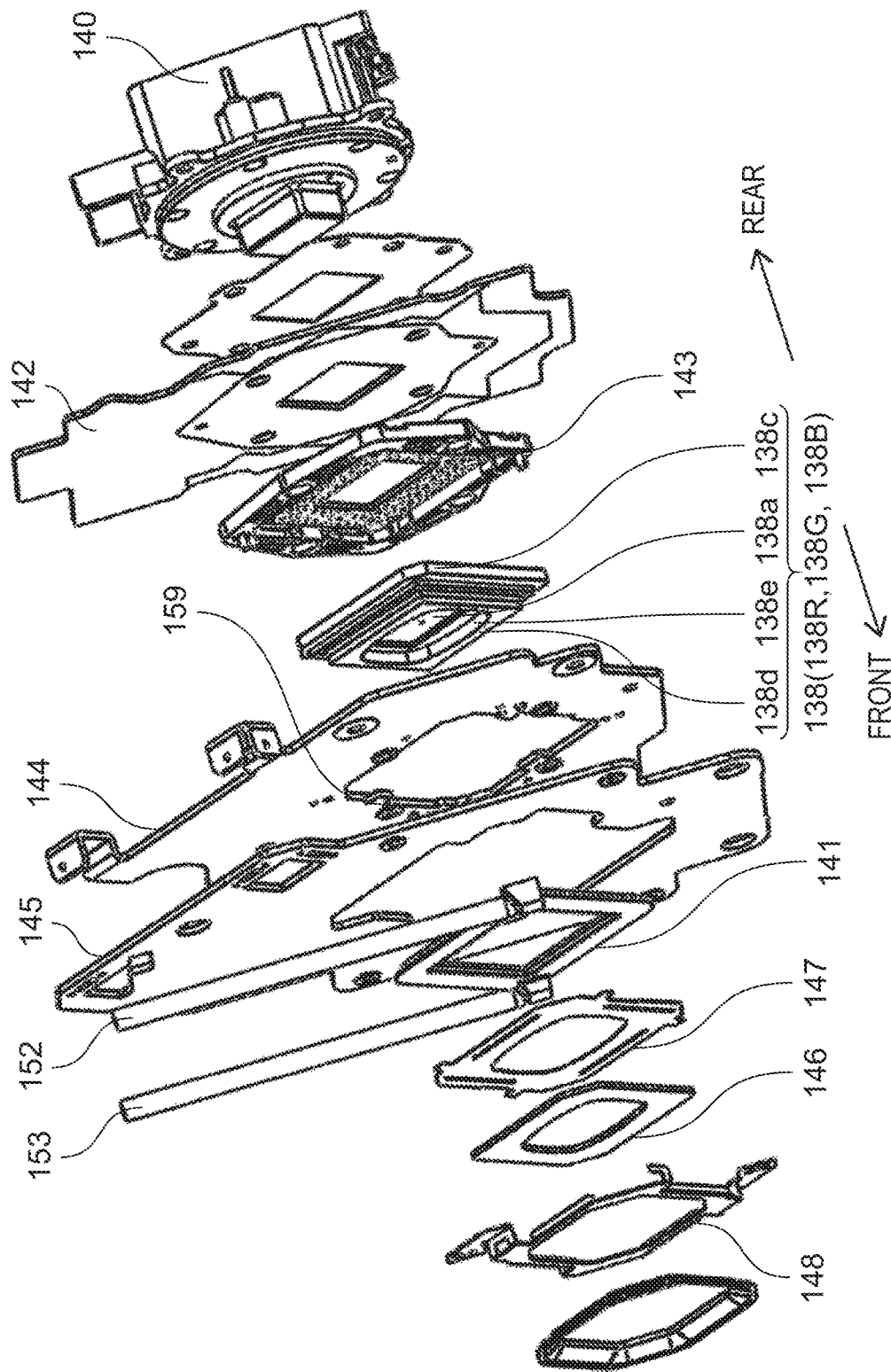
FIG. 3 is a peripheral configuration diagram of an image display element of the first exemplary embodiment.

Image display element 138 receives and reflects strong light from light source unit 101, but generates heat due to light incident and absorbed between the micromirrors constituting reflective image display 138*a* of image display element 138 and driving of image display element 138 itself. In order to ensure the reliability of image display element 138, it is required to maintain a desired temperature. Therefore, as illustrated in FIG. 3, first heat receiving unit 141 and second heat receiving unit 140 are provided.

A peripheral structure of image display element 138 will be described with reference to FIG. 3. FIG. 3 is a peripheral configuration diagram of the image display element, and illustrates a peripheral structure of the image display element corresponding to one color light of three image display elements 138R, 138G, 138B. Drive board 142 is connected to a controller (not illustrated), and receives an external signal corresponding to image content to be displayed from the controller. Drive board 142 and image display element 138 are electrically connected via socket 143.

Image display element 138 is sandwiched and supported between fixing metal fitting 144 and metal fitting 145. On a front side of image display element 138, mask substrate 146 and heat insulating substrate 147 that transmit effective light incident on reflective image display 138*a* are supported by mask substrate support metal fitting 148, and first heat receiving unit 141 is disposed between image display element 138 and heat insulating substrate 147. Mask substrate 146 absorbs stray light traveling in each of first to third prisms 134, 136, 137.

Second heat receiving unit 140 is in contact with a back surface of image display element 138 via conductive grease by a pressing spring (not illustrated), and can receive driving heat of image display element 138. First heat receiving unit 141 is thermally connected to an outer face part of protruding part 138*d* protruding forward of image display element 138 via sheet-like heat conductive member 155 (see FIG. 10A).

Figure 4:
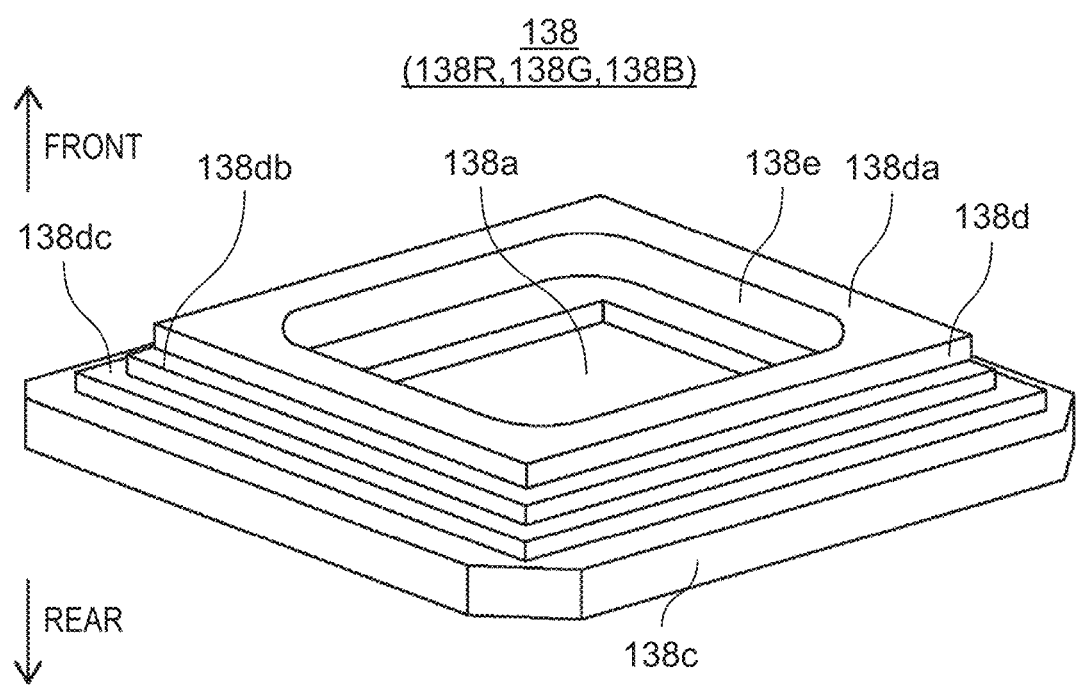
FIG. 4 is a perspective view of the image display element of the first exemplary embodiment.

Next, the following description refers to FIG. 4. FIG. 4 is a perspective view of the image display element. Image display element 138 has quadrangular cylindrical protruding part 138*d* protruding forward from base part 138*c*. Protruding part 138*d* has opening 138*e*, and a front face of reflective image display 138*a* disposed on base part 138*c* is exposed through opening 138*e*. Protruding part 138*d* has a rectangular shape in a front view.

Figure 5:
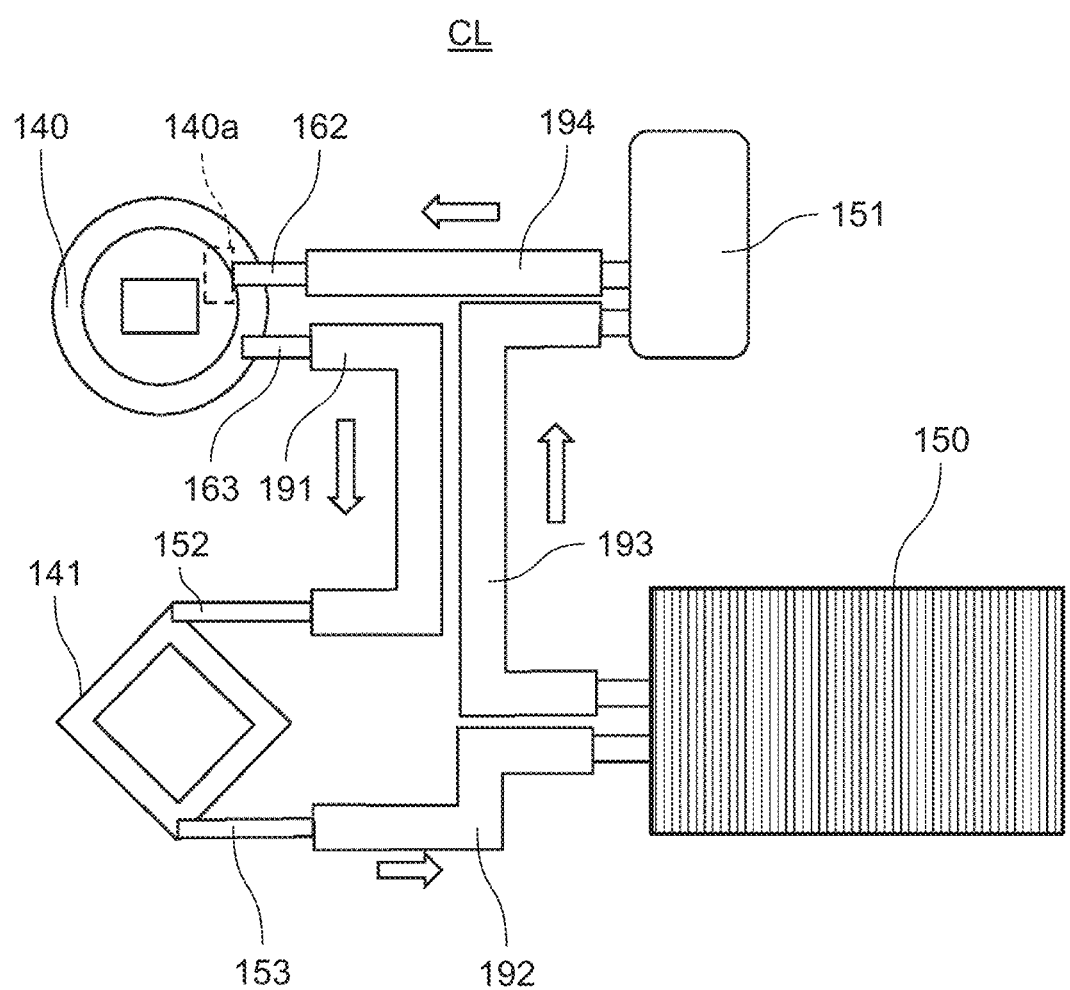
FIG. 5 is a diagram illustrating connection of a liquid-cooled module of a cooling device according to the first exemplary embodiment.

Next, the following description refers to FIG. 5. FIG. 5 is a diagram illustrating connection of a liquid-cooled module of cooling device CL. First heat receiving unit 141 includes first inflow pipe 152 through which a refrigerant flows into first heat receiving unit 141, and a first outflow pipe 153 through which the refrigerant flows out of first heat receiving unit 141. Second heat receiving unit 140 includes second inflow pipe 162 through which the refrigerant flows into second heat receiving unit 140, and second outflow pipe 163 through which the refrigerant flows out of second heat receiving unit 140.

Second heat receiving unit 140 incorporates pump 140*a*, and the refrigerant sent from second heat receiving unit 140 flows into first heat receiving unit 141 through second outflow pipe 163, pipe 191, and first inflow pipe 152. The refrigerant flowing into first heat receiving unit 141 absorbs the heat of the front face of image display element 138, and the temperature thereof rises. The refrigerant whose temperature has increased flows out of first heat receiving unit 141, passes through first outflow pipe 153 and pipe 192, and flows into radiator 150 as a heat dissipation part. The refrigerant is cooled by radiator 150, and the cooled refrigerant passes through pipe 193, reserve tank 151, and pipe 194 and circulates to second heat receiving unit 140 again.

Figure 6:
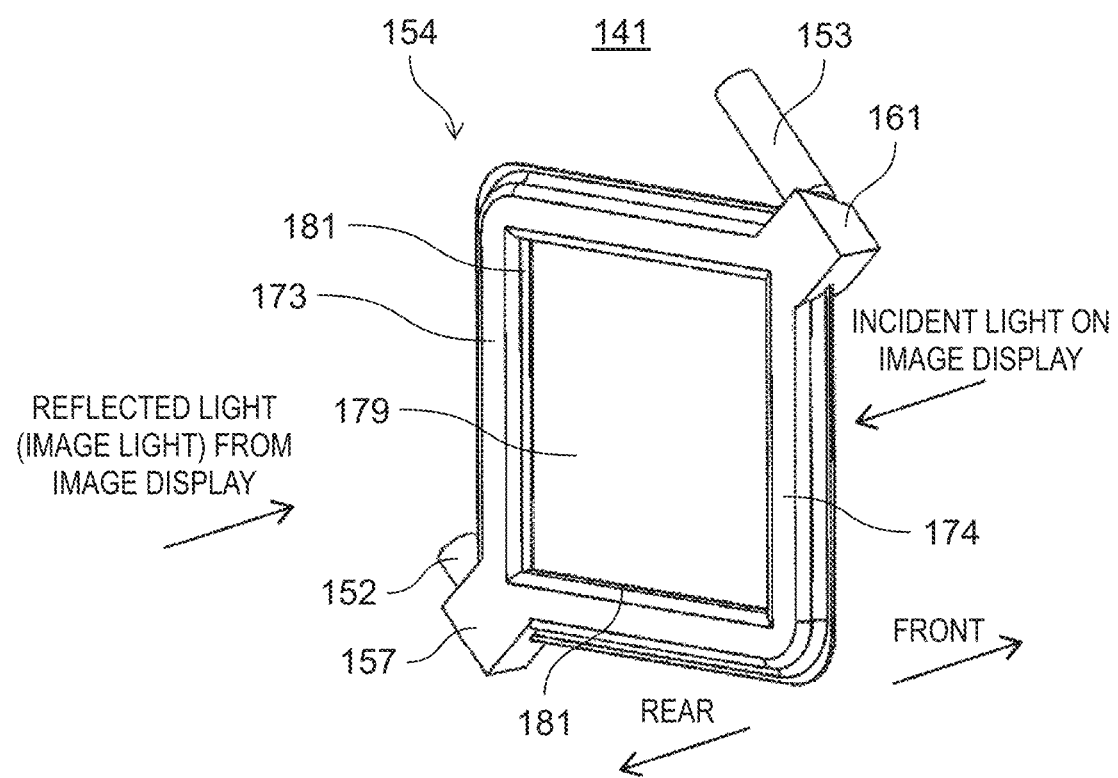
FIG. 6 is a perspective view of a first heat receiving unit according to the first exemplary embodiment.
Figure 7A:
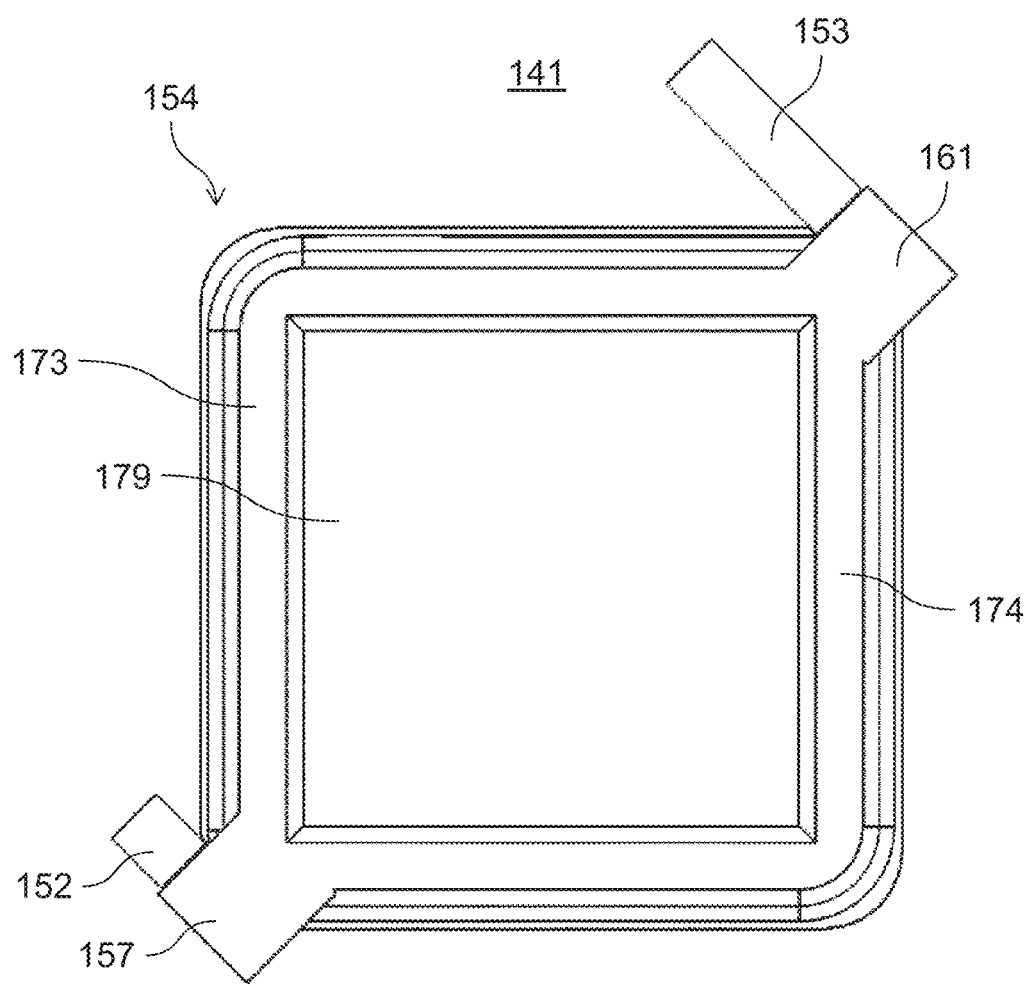
FIG. 7A is a rear view of the first heat receiving unit according to the first exemplary embodiment.
Figure 7B:
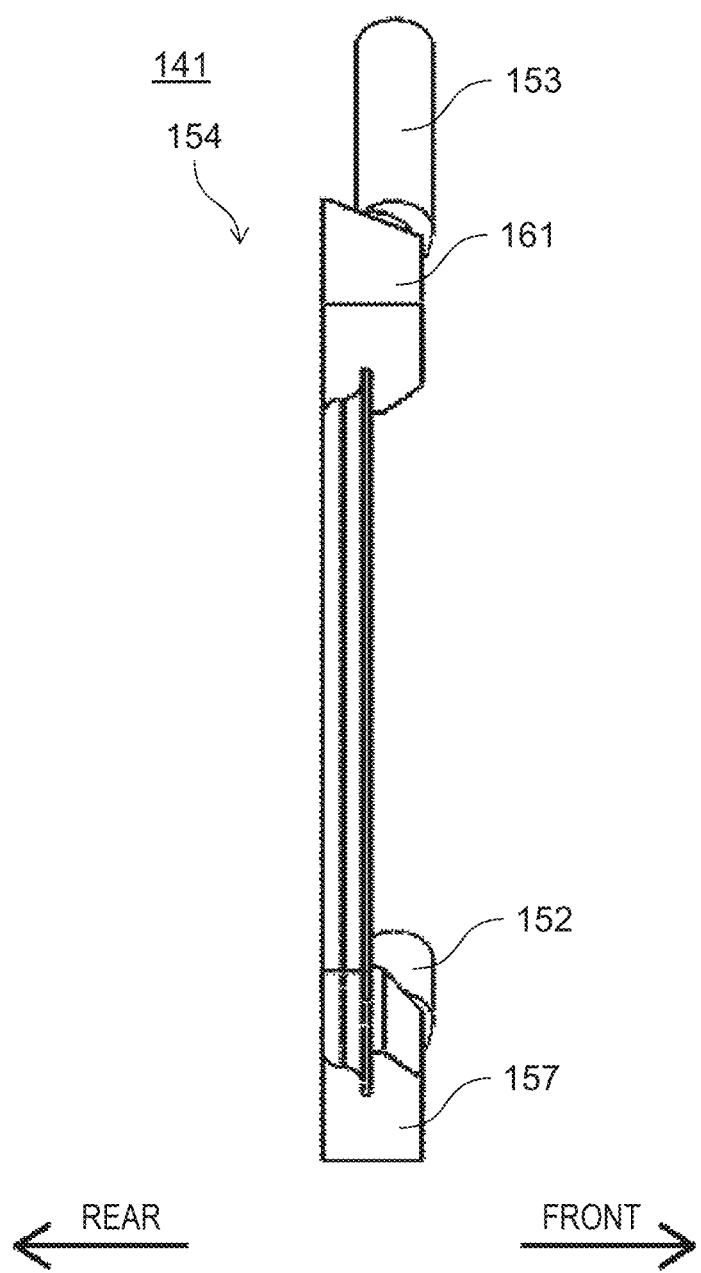
FIG. 7B is a side view of the first heat receiving unit according to the first exemplary embodiment.
Figure 7C:
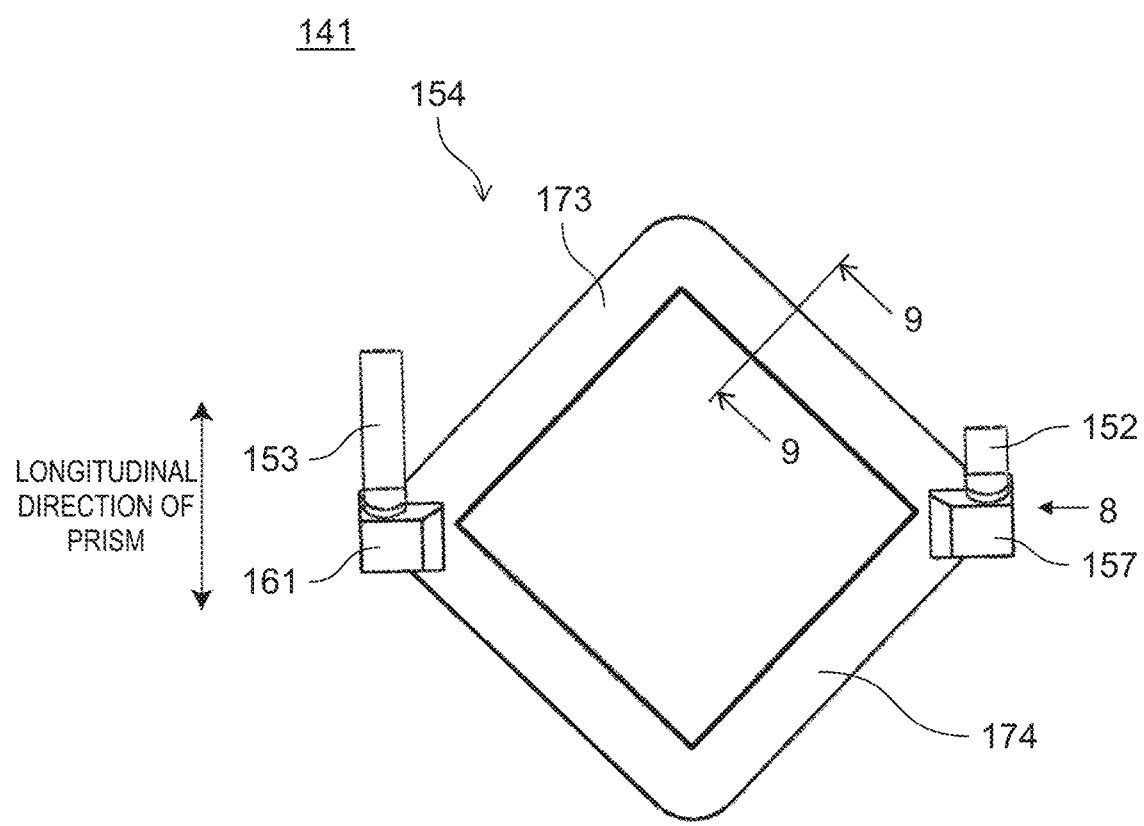
FIG. 7C is a front view of the first heat receiving unit according to the first exemplary embodiment.
Figure 8:
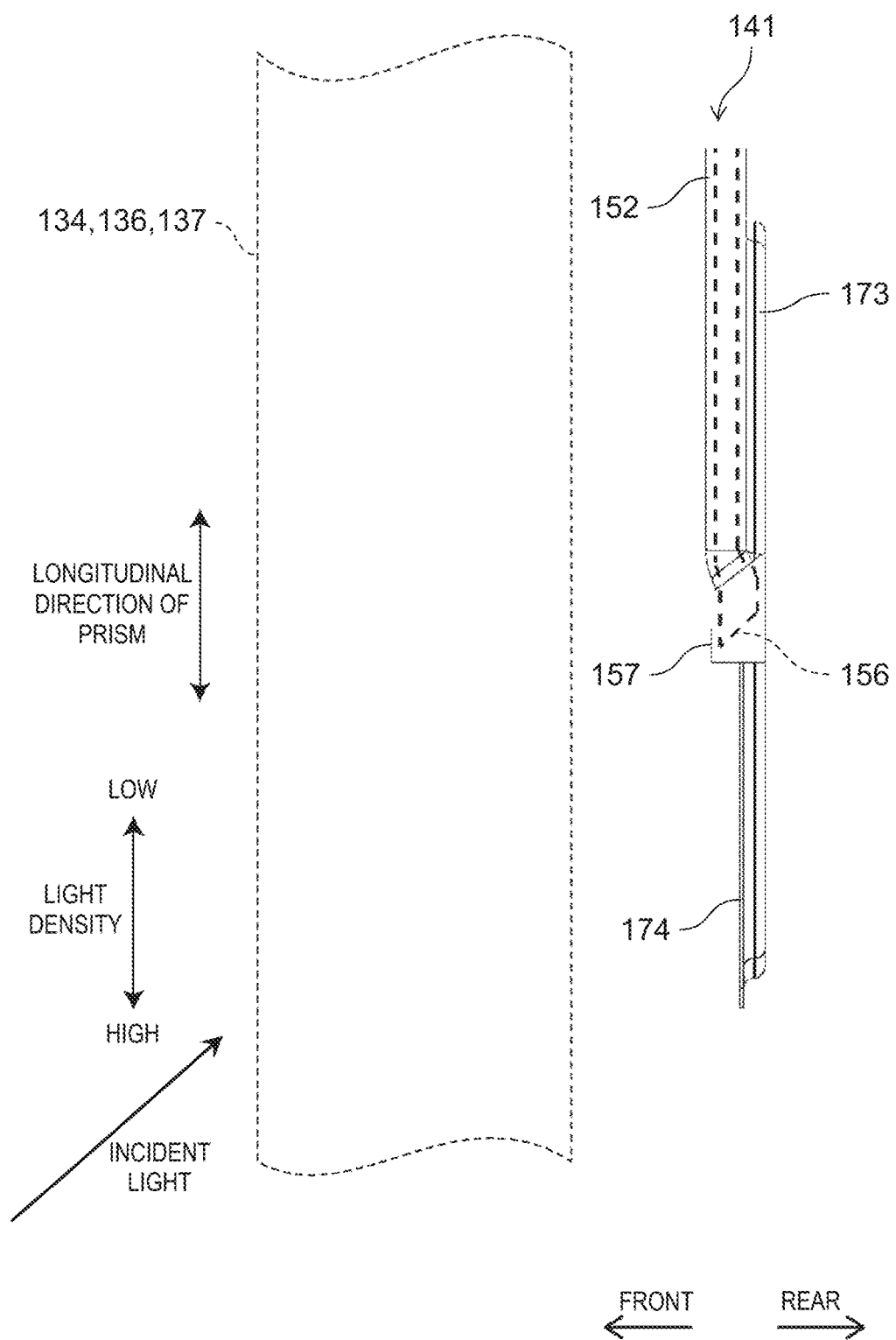
FIG. 8 is an eight-direction arrow view of the first heat receiving unit in FIG. 7C.
Figure 9:
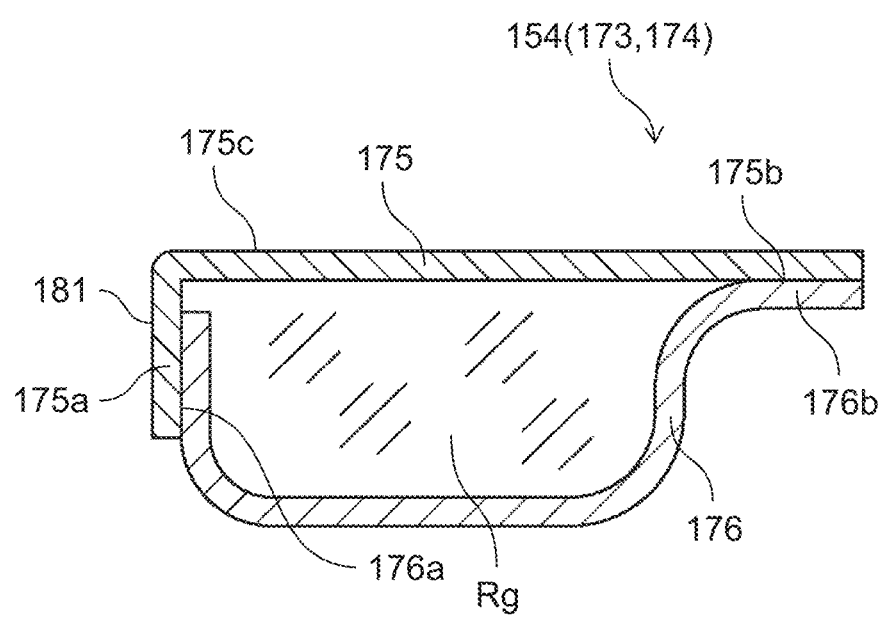
FIG. 9 is a cross-sectional view taken along line 9-9 of the first heat receiving unit in FIG. 7C.

Next, a configuration of first heat receiving unit 141 will be described with reference to FIGS. 6 to 9. FIG. 6 is a perspective view of first heat receiving unit 141. FIG. 7A is a rear view of first heat receiving unit 141. FIG. 7B is a side view of first heat receiving unit 141. FIG. 7C is a front view of first heat receiving unit 141. FIG. 8 is an eight-direction arrow view in FIG. 7C. FIG. 9 is a cross-sectional view taken along line 9-9 in FIG. 7C.

First inflow pipe 152 is connected to or near one of the four corners of flow path part 154. Flow path part 154 is formed along the shape of the front face of image display element 138. Flow path part 154 has, for example, opening 179 fitted into an outer face of protruding part 138d of image display element 138. Flow path part 154 branches in two directions from a connection point of first inflow pipe 152, goes around image display element 138, joins again, and reaches first outflow pipe 153. The refrigerant flowing from first inflow pipe 152 flows out of first outflow pipe 153 through flow path part 154, and reaches radiator 150 through the pipe.

First inflow pipe 152 and first outflow pipe 153 are connected so as to be positioned diagonally at the four corners of flow path part 154. First inflow pipe 152 is connected by first joint 157 located at one corner of flow path part 154. First outflow pipe 153 is connected by second joint 161 located at one corner of flow path part 154.

Flow path part 154 includes first pipe 173 and second pipe 174 branching from first joint 157. First pipe 173 and second pipe 174 merge at second joint 161. First pipe 173 and second pipe 174 have the same length. That is, a distance from first inflow pipe 152 to first outflow pipe 153 in flow path part 154 is the same, and a flow rate of refrigerant Rg is branched in a well-balanced manner. Here, the same length of first pipe 173 and second pipe 174 does not have to be exactly the same length, and may be substantially the same length. As described above, since image display element 138 and flow path part 154 are thermally connected via heat conductive member 155, heat of a front part of image display element 138 can be absorbed.

First heat receiving unit 141 includes opening 179 in a central part. Opening 179 is formed by first pipe 173 and second pipe 174. Opening 179 has a shape larger than a distal end shape of protruding part 138d of image display element 138 by about one, and has, for example, a rectangular shape.

In first heat receiving unit 141, two corners of rectangular flow path part 154, first inflow pipe 152, and first outflow pipe 153 are brazed via first joint 157 and second joint 161, respectively. First inflow pipe 152 is connected to first joint 157 by bending a round pipe, and first outflow pipe 153 is similarly connected to second joint 161.

As illustrated in FIG. 9, flow path part 154 (first inflow pipe 152 and first outflow pipe 153) is formed by brazing upper and lower two thin metal plates 175, 176. At this time, for example, flow path part 154 can be formed by assembling metal plates 175, 176 made of a clad material and passing the metal plates through a heating furnace. Flow path part 154 is made of, for example, an aluminum clad material.

As illustrated in FIGS. 10A and 10B, protruding part 138d of image display element 138 has a stair shape at the outer part. Protruding part 138d includes first front face 138da, second front face 138db formed one step below (rearward), and third front face 138dc as a contact face formed one step further below (rearward). Second front face 138db is formed outside first front face 138da, and third front face 138dc is formed outside second front face 138db. First front face 138da and second front face 138db are connected to each other at first side face 138dd as a rising wall part. Second front face 138db and third front face 138dc are connected by second side face 138de as a rising wall part.

First side face 138dd extends rearward from an outer end of first front face 138da. Second front face 138db extends parallel to first front face 138da outward from a rear end of first side face 138dd. Second side face 138de extends rearward from an outer end of second front face 138db. Third front face 138dc extends parallel to first front face 138da outward from a rear end of second side face 138de. First front face 138da and first side face 138dd constitute first step part 138df, and second side face 138de and third front face 138dc constitute second step part 138dg.

Flow path part 154 of first heat receiving unit 141 is in contact with first side face 138dd and second front face 138db of protruding part 138d via heat conductive member 155. As a result, even when stray light that has not been absorbed by mask substrate 146 is applied to protruding part 138d and the front face of reflective image display 138a, heat due to the irradiation can be transmitted to flow path part 154 via heat conductive member 155.

Front face 175c of flow path part 154 of first heat receiving unit 141 is located on the same face as first front face 138da of protruding part 138d or in front of first front face 138da, that is, so as to be convex in a traveling direction of the modulated light. As a result, even when bending R is required at a corner between front face 175c of flow path part 154 and inner wall part 181 in processing of metal plate 175, a contact area with first side face 138dd can be sufficiently secured.

In order to simplify the processing of upper and lower metal plates 175, 176, a part facing first side face 138dd of protruding part 138d of image display element 138 is formed in each of metal plate 175 and metal plate 176, and these facing parts are brazed to each other as first brazed faces 175a, 176a. Furthermore, a part extending to an outer periphery of flow path part 154 is formed in each of metal plate 175 and metal plate 176 in a direction perpendicular to first side face 138dd, and these extending parts are brazed to each other as second brazed faces 175b, 176b, respectively.

A face of metal plate 175 opposite to first brazed face 175a constitutes inner wall part 181 of flow path part 154. Therefore, respective first brazed faces 175a, 176a to be brazed of two metal plates 175, 176 are parallel to inner wall part 181 forming opening 179.

In flow path part 154, the heat resistance between image display element 138 and refrigerant Rg can be further reduced as the thickness of the part facing first side face 138dd of image display element 138 is thinner. However, flow path part 154 can be easily created by brazing on each of first brazed faces 175a, 176a facing first side face 138dd.

Furthermore, as illustrated in FIG. 8, first joint 157 has inclined face 156 that is a face intersecting with an inflow direction of the refrigerant in the internal structure indicated by a broken line. The refrigerant flowing into first joint 157 from first inflow pipe 152 through reserve tank 151 collides with inclined face 156. As a result, even when air is mixed in the refrigerant, the air flows as fine bubbles due to the collision. As described above, since the air reservoir is less likely to occur in first joint 157, the refrigerant is poured downstream without stagnation. Inclined face 156 is not limited to first joint 157, and may be disposed at least before refrigerant Rg reaches flow path part 154 via first inflow pipe 152.

Since first joint 157 and second joint 161 are respectively interposed in the connections between flow path part 154 and first inflow pipe 152 and first outflow pipe 153, in order to store the inflow pipe and the outflow pipe in a space where they can be disposed, first inflow pipe 152 and first outflow pipe 153 can be connected to flow path part 154 without forming small bend R at the roots thereof.

As illustrated in FIGS. 3 and 4, in image display element 138, one face of the stepped plane part of protruding part 138*d* is third front face 138*dc*, and third front face 138*dc* is in contact with claw part 159 of fixing metal fitting 144. First inflow pipe 152 and first outflow pipe 153 extend between prism unit 132 disposed facing image display element 138 and image display element 138, and are connected to another cooling module.

First heat receiving unit 141 is disposed closer to fixing metal fitting 144 than a space formed by fixing metal fitting 144 and prism unit 132, and first inflow pipe 152 and first outflow pipe 153 are eccentrically disposed closer to the prism than flow path part 154, so that first inflow pipe 152 and first outflow pipe 153 can be disposed even in a narrow space. This eccentricity can be achieved by bending the pipe as in the example of FIG. 11, or by eccentrically providing the inflow side and the outflow side at the joint part as in FIG. 4.

Furthermore, as illustrated in FIGS. 7C and 8, first inflow pipe 152 and first outflow pipe 153 of first heat receiving unit 141 extend along a longitudinal direction of prisms 134, 136, 137 facing image display element 138 to an opposite side of the incident direction of the incident light on reflective image display 138*a*.

Figure 11:
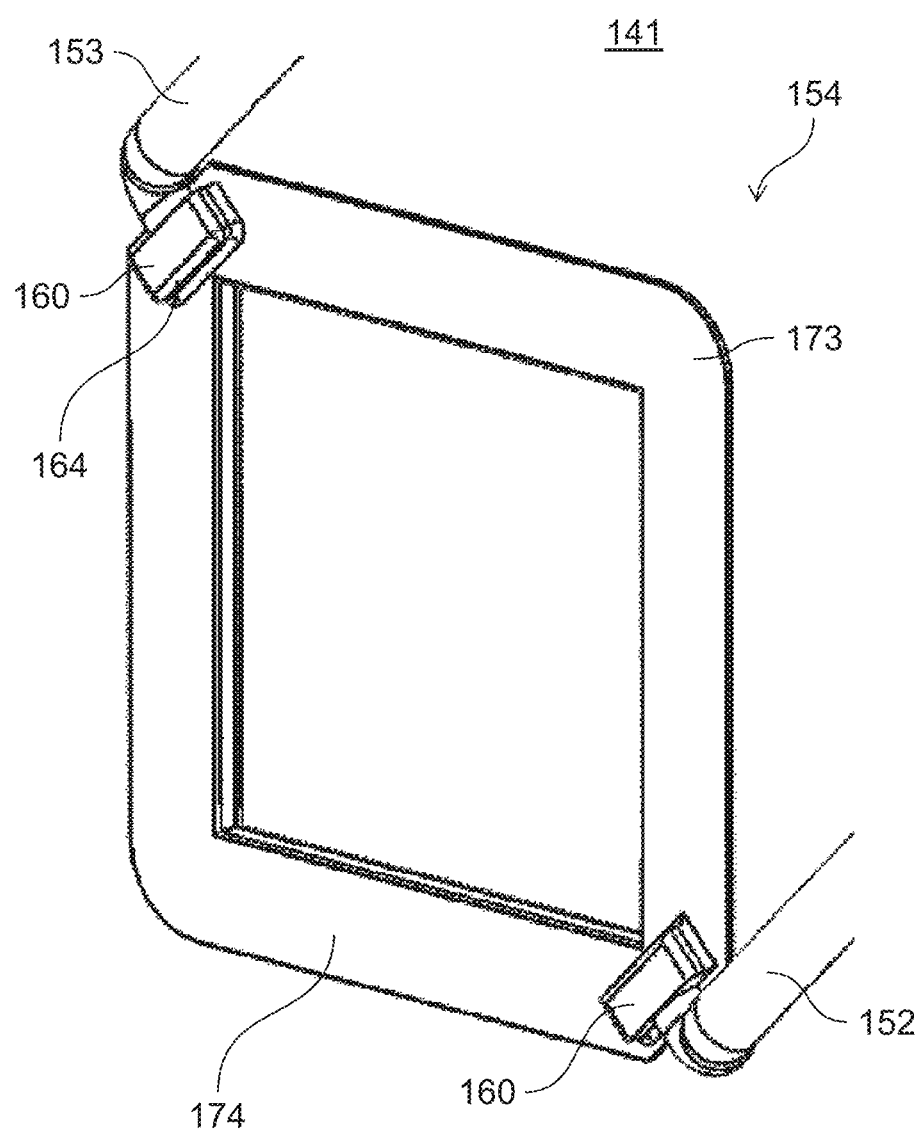
FIG. 11 is a perspective view of a first heat receiving unit according to a first modification example of the first exemplary embodiment.

A first modification example of first heat receiving unit 141 will be described with reference to FIG. 11. FIG. 11 is a perspective view illustrating the first modification example of first heat receiving unit 141. In FIG. 11, when first inflow pipe 152 and first outflow pipe 153 can be bent by 90 degrees in the pipe connection between first inflow pipe 152 and first outflow pipe 153 and flow path part 154, convex part 160 is provided at a root of flow path part 154, and the refrigerant flowing into vertical wall part 164 collides with the refrigerant, so that it is possible to obtain an effect similar to that of above-described inclined face 156 (see FIG. 8). In this regard, inclined face 156 and vertical wall part 164 may be omitted as long as reserve tank 151 has a function of removing air mixed in the refrigerant. However, the presence of inclined face 156 and vertical wall part 164 is advantageous for balancing a flow rate of refrigerant Rg when flow path part 154 branches into two.

In FIG. 9, flow path part 154 is formed of two sheets of sheet metal, but may be formed of sheet metal and a cut component. Processing cost can be reduced when flow path part 154 is formed of two sheet metals.

In the first exemplary embodiment, second heat receiving unit 140 includes pump 140*a*. However, pump 140*a* may be provided separately from second heat receiving unit 140.

2. Effects and Others

As described above, projection display apparatus 100 according to the present exemplary embodiment includes light source unit 101 that emits light, image display element 138 that includes reflective image display 138*a* that modulates the light from light source unit 101 according to an external signal, cooling device CL that cools image display element 138, and projection lens unit 139 that enlarges and projects an image generated by the light modulated by image display element 138. Cooling device CL includes first heat receiving unit 141 having rectangular opening 179 in a central part, pump 140*a* that sends refrigerant Rg that is liquid to first heat receiving unit 141, and radiator 150 that radiates heat received by refrigerant Rg. First heat receiving unit 141 includes first inflow pipe 152 into which refrigerant Rg flows from pump 140*a*, first outflow pipe 153 from which refrigerant Rg flows out, and flow path part 154 forming opening 179 and connecting first inflow pipe 152 and first outflow pipe 153. Image display element 138 has protruding part 138*d* located outside reflective image display 138*a*. Protruding part 138*d* includes first front face 138*da* located in front of reflective image display 138*a*, first side face 138*dd* extending rearward from an outer end of first front face 138*da*, and second front face 138*db* extending outward from a rear end of first side face 138*dd* and parallel to first front face 138*da*. Protruding part 138*d* of image display element 138 is inserted into opening 179 of first heat receiving unit 141, and flow path part 154 of first heat receiving unit 141 is in contact with first side face 138*dd* and second front face 138*db* of protruding part 138*d* via heat conductive member 155. Front face 175*c* of flow path part 154 of first heat receiving unit 141 is located on the same face as first front face 138*da* of protruding part 138*d* or in front of first front face 138*da*.

Since flow path part 154 of first heat receiving unit 141 comes into contact with first side face 138*dd* and second front face 138*db* of protruding part 138*d* of image display element 138 via heat conductive member 155, it is possible to efficiently cool the light incident side of image display element 138. Furthermore, front face 175*c* of flow path part 154 of first heat receiving unit 141 is located on the same face as first front face 138*da* of protruding part 138*d* or in front of first front face 138*da* of protruding part 138*d*, and a contact area with first side face 138*dd* can be sufficiently secured even when bending R is required at a corner between front face 175*c* of flow path part 154 and inner wall part 181 in processing of metal plate 175.

Flow path part 154 of first heat receiving unit 141 has first pipe 173 and second pipe 174 which are branched from first inflow pipe 152 and joined at first outflow pipe 153, first pipe 173 and second pipe 174 form different sides of rectangular opening 179 of first heat receiving unit 141, and first pipe 173 and second pipe 174 have the same length. Since first pipe 173 and second pipe 174 have the same length, branched flow path part 154 can be uniformly cooled along opening 179.

First inflow pipe 152 and first outflow pipe 153 of first heat receiving unit 141 extend along the longitudinal direction of each face of prisms 134, 136, 137 facing image display element 138. As a result, the space of the front face cooling structure of image display element 138 can be saved.

First heat receiving unit 141 has inclined face 156 intersecting with the inflow direction of refrigerant Rg at least until refrigerant Rg reaches flow path part 154 via first inflow pipe 152, and refrigerant Rg collides with intersecting inclined face 156. Accordingly, even when refrigerant Rg contains air, the air flows as fine bubbles, so that clogging of refrigerant Rg can be prevented.

First inflow pipe 152 of the first heat receiving unit 141 and flow path part 154 are connected via first joint 157, or first outflow pipe 153 of first heat receiving unit 141 and flow path part 154 are connected via second joint 161.

Projection display apparatus 100 includes second heat receiving unit 140 that receives driving heat of image display element 138, first heat receiving unit 141 is disposed between prism unit 132 and image display element 138, and image display element 138 is disposed between first heat receiving unit 141 and second heat receiving unit 140. Second heat receiving unit 140 includes second inflow pipe 162 into which refrigerant Rg flows and second outflow pipe 163 from which refrigerant Rg flows out.

Since image display element 138 is disposed between first heat receiving unit 141 and second heat receiving unit 140 and is cooled by each of first heat receiving unit 141 and second heat receiving unit 140, both faces of the image display element 138 can be cooled, and cooling efficiency can be improved.

Second outflow pipe 163 and first inflow pipe 152 are connected in series such that refrigerant Rg flowing out of second outflow pipe 163 of second heat receiving unit 140 reaches first inflow pipe 152 of first heat receiving unit 141. As a result, the cooling structure of image display element 138 can be saved in space.

Flow path part 154 of first heat receiving unit 141 includes two brazed metal plates 175, 176, and first brazed faces 175a, 176a, which are mating faces where two metal plates 175, 176 are brazed, are parallel to inner wall part 181 of flow path part 154 forming opening 179.

Flow path part 154 of first heat receiving unit 141 includes two brazed metal plates 175, 176, and second brazed faces 175b, 176b, which are mating faces where two metal plates 175, 176 are brazed, extend from the outer periphery of flow path part 154 in a direction perpendicular to inner wall part 181 of flow path part 154 forming opening 179.

Second Exemplary Embodiment

Figure 12:
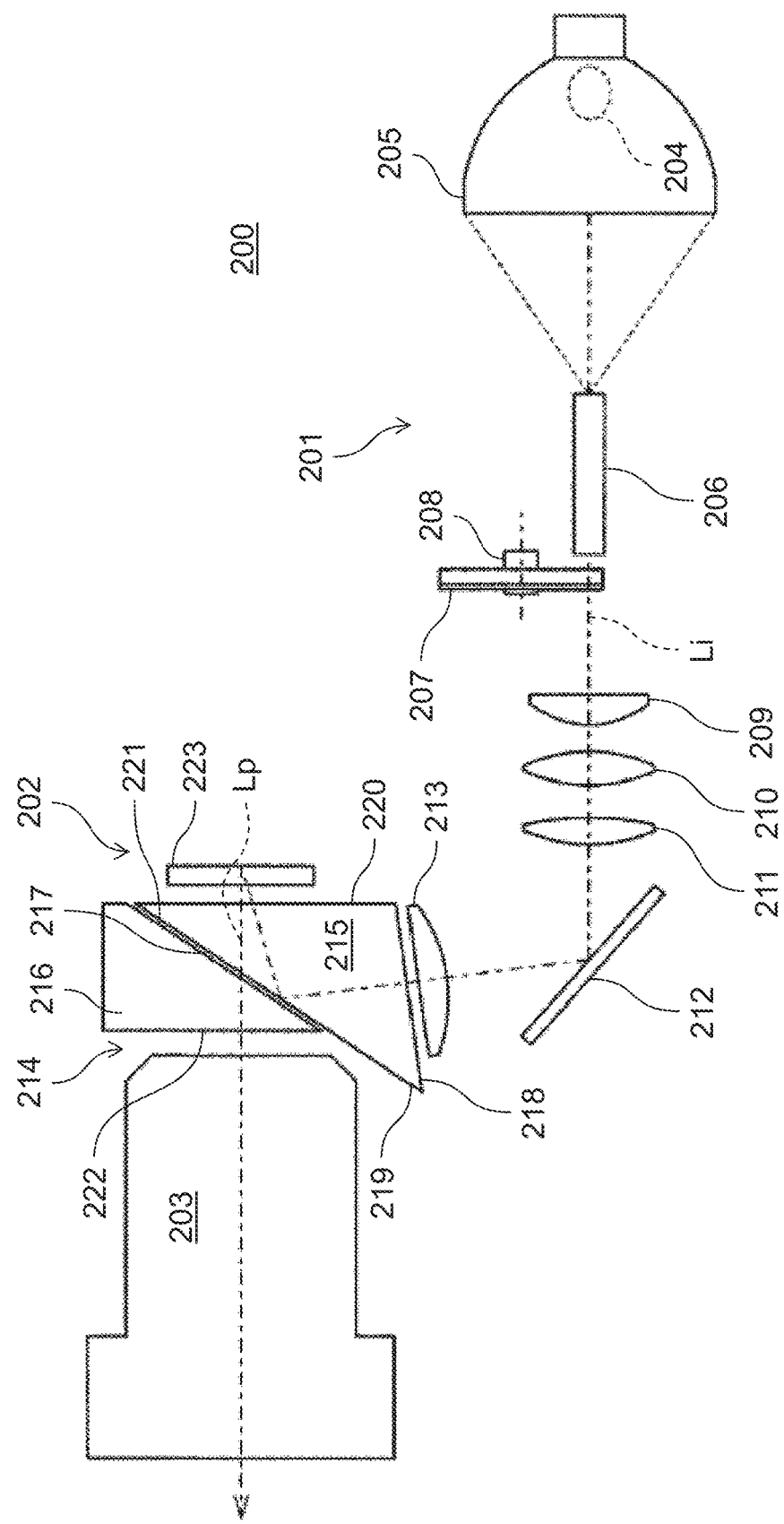
FIG. 12 is a configuration diagram of a projection display apparatus according to a second exemplary embodiment.

Projection display apparatus 200 according to a second exemplary embodiment projects a full-color image with a configuration different from the configuration of projection display apparatus 100 according to the first exemplary embodiment. Projection display apparatus 200 according to the second exemplary embodiment of the present disclosure will be described with reference to FIG. 12. FIG. 12 is a schematic diagram illustrating a configuration of projection display apparatus 200 according to the second exemplary embodiment of the present disclosure. Note that projection display apparatus 200 according to the second exemplary embodiment and projection display apparatus 100 according to the first exemplary embodiment have the same configuration except for the points described below.

As illustrated in FIG. 12, projection display apparatus 200 according to the second exemplary embodiment includes light source unit 201 that generates light, image generation unit 202 that converts the light into image light, and projection lens unit 203 that projects the image light onto a screen, for example.

In the case of the second exemplary embodiment, light source unit 201 includes, for example, light source lamp 204 that is a high-pressure mercury lamp and emits white diffused light. Furthermore, light source unit 201 includes a plurality of optical elements that guides light emitted from light source lamp 204 to image generation unit 202. These optical elements will be described along with the propagation of light.

Diffused light emitted from light source lamp 204 is condensed on an incident surface of rod integrator 206 having a rectangular cross section by reflector 205.

Color wheel 207 is disposed in front of an emission surface of rod integrator 206. Color wheel 207 includes a red transmission filter that transmits only red light included in the white light from light source lamp 204, a green transmission filter that transmits only green light, and a blue transmission filter that transmits only blue light. When color wheel 207 is rotated by motor 208, the red transmission filter, the green transmission filter, and the blue transmission filter are sequentially and repeatedly disposed in front of the emission surface of rod integrator 206. As a result, red light, green light, and blue light are sequentially and repeatedly emitted from color wheel 207.

The light that has passed through color wheel 207 enters image generation unit 202 via lens 209, lens 210, lens 211, mirror 212, and lens 213.

In the second exemplary embodiment, image generation unit 202 includes total reflection prism 214 and one image display element 223.

In the second exemplary embodiment, total reflection prism 214 includes first prism 215 and second prism 216. First prism 215 and second prism 216 are prisms having a substantially triangular prism shape, and are made of, for example, a glass material. Air gap 217 of several μm is formed between first prism 215 and second prism 216.

First prism 215 includes side face 218 on which light Li from light source unit 201 is incident, side face 219 which reflects incident light Li, and side face 220 which transmits reflected light Li and faces image display element 223.

Second prism 216 includes side face 221 forming air gap 217 by facing side face 219 of first prism 215 at an interval in parallel, and side face 222 facing projection lens unit 203. Side face 219 of first prism 215 and side face 221 of second prism 216 are bonded to each other via an adhesive at a part other than the light transmitting part, for example, to form air gap 217.

Image display element 223 includes a DMD as a reflective image display. Light, that is, red light, green light, and blue light are sequentially and repeatedly incident on image display element 223 from light source unit 201 through first prism 215 of total reflection prism 214.

Furthermore, reflected light from image display element 223, namely, image light Lp enters total reflection prism 214, passes through air gap 217 (internal total reflection face), and is emitted from side face 222 of second prism 216 to projection lens unit 203. Then, the image light is projected onto a screen by projection lens unit 203.

Also in the second exemplary embodiment, similarly to the first exemplary embodiment described above, first heat receiving unit 141A is provided around a front face of the DMD of image display element 223.

Figure 13:
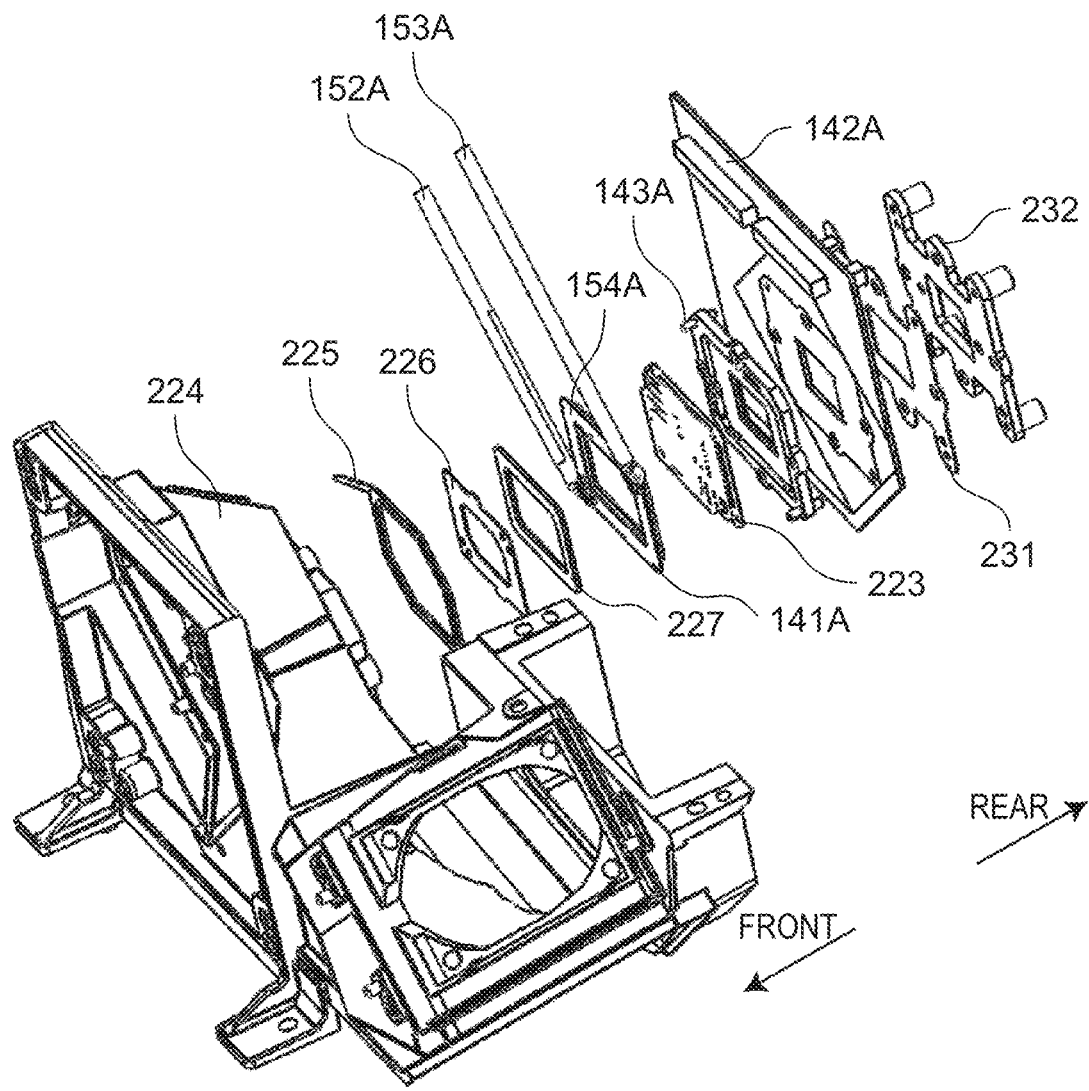
FIG. 13 is a peripheral configuration diagram of an image display element according to the second exemplary embodiment.

FIG. 13 is a perspective view illustrating a peripheral structure of image display element 223. As illustrated in FIG. 13, image generation unit 202 includes prism case 224, packing 225, light shielding mask 226, heat insulating material 227, first heat receiving unit 141A, drive board 142A, socket 143A, insulating sheet 231, and presser metal fitting 232.

Image display element 223 is disposed without a gap with respect to prism case 224 in which total reflection prism 214 is included and to which side face 220 is applied via packing 225, light shielding mask 226, and heat insulating material 227, and first heat receiving unit 141A similar to that of the first exemplary embodiment is connected to a periphery of the DMD of image display element 223 via a heat conductive member not illustrated in the drawing. On the other hand, image display element 223 is disposed on socket 143A, drive board 142A, insulating sheet 231, and presser metal fitting 232, and image display element 223 and drive board 142A are electrically connected.

Although not illustrated in FIG. 13, as illustrated in FIG. 3, second heat receiving unit 140 of the first exemplary embodiment is disposed on a back surface of presser metal fitting 232.

Similarly to the first exemplary embodiment, the liquid-cooled module can be connected in the second exemplary embodiment as illustrated in FIG. 5, and a pump for circulating the refrigerant may be provided separately from the heat receiving unit on a back surface side.

Similarly to first heat receiving unit 141 of the first exemplary embodiment, first heat receiving unit 141A has the configuration illustrated in FIGS. 4 and 10, and can take heat from a front face of image display element 223. Note that, in the second exemplary embodiment, since it is not necessary to provide image display element 223 for each color light, the degree of freedom in a drawing direction of first inflow pipe 152A and first outflow pipe 153A is high, and the necessity of alignment in the same direction is low. This is optimized in accordance with the peripheral structure, and is not restricted as a basic structure.

First heat receiving unit 141A is also configured by brazing first inflow pipe 152A and first outflow pipe 153A formed by bending round pipes to both ends of flow path part 154A. Flow path part 154A is also formed by brazing two upper and lower thin plates, and flow path part 154A is optimized in accordance with the dimensions of image display element 223.

Here, image display element 223 is sandwiched between socket 143A and prism case 224, and is designed such that prism case 224 and third front face 138dc contact each other. At this time, first heat receiving unit 141A is included in prism case 224, and first inflow pipe 152A and first outflow pipe 153A extend from side faces thereof. At that time, first inflow pipe 152A and first outflow pipe 153A only need to be at positions that do not interfere with socket 143A, and unlike the first exemplary embodiment, there are few restrictions on the light input and output direction with respect to flow path part 154A.

Even when the drawing direction and the eccentric position of first inflow pipe 152A and first outflow pipe 153A are different in the second exemplary embodiment, it is possible to similarly obtain the effect of enabling distribution to the flow paths in two directions and discharge of mixed air by forming inclined face 156 by providing a convex part at the root and causing the inflow refrigerant to collide. Also in the second exemplary embodiment, flow path part 154A is formed of two metal plates, but may be formed of a sheet metal and a cut component.

Third Exemplary Embodiment

1. Configuration

Figure 14:
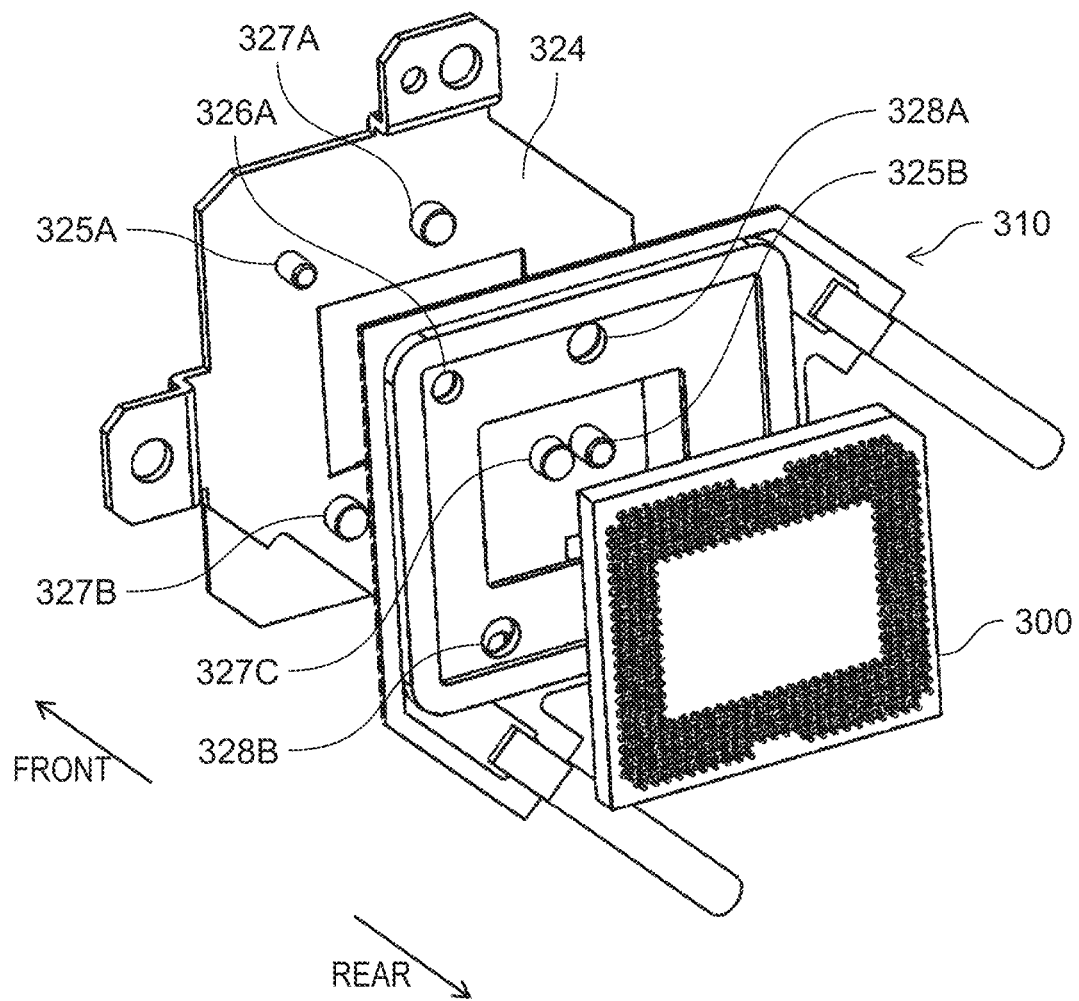
FIG. 14 is a peripheral configuration diagram of a first heat receiving unit according to a third exemplary embodiment.
Figure 17A:
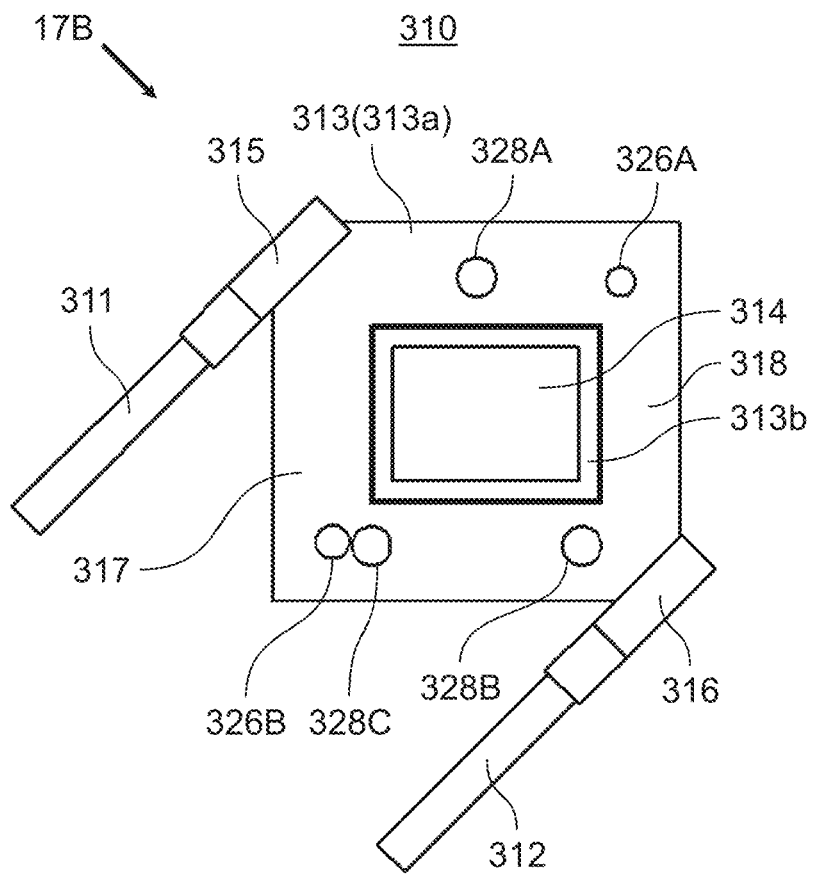
FIG. 17A is a front view of a first heat receiving unit according to the third exemplary embodiment.
Figure 17B:
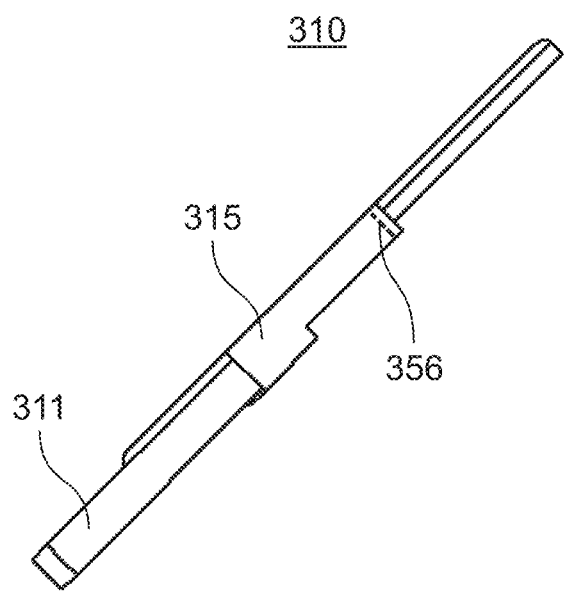
FIG. 17B is a view of the first heat receiving unit in FIG. 17A as viewed in a direction of arrow 17B.
Figure 18:
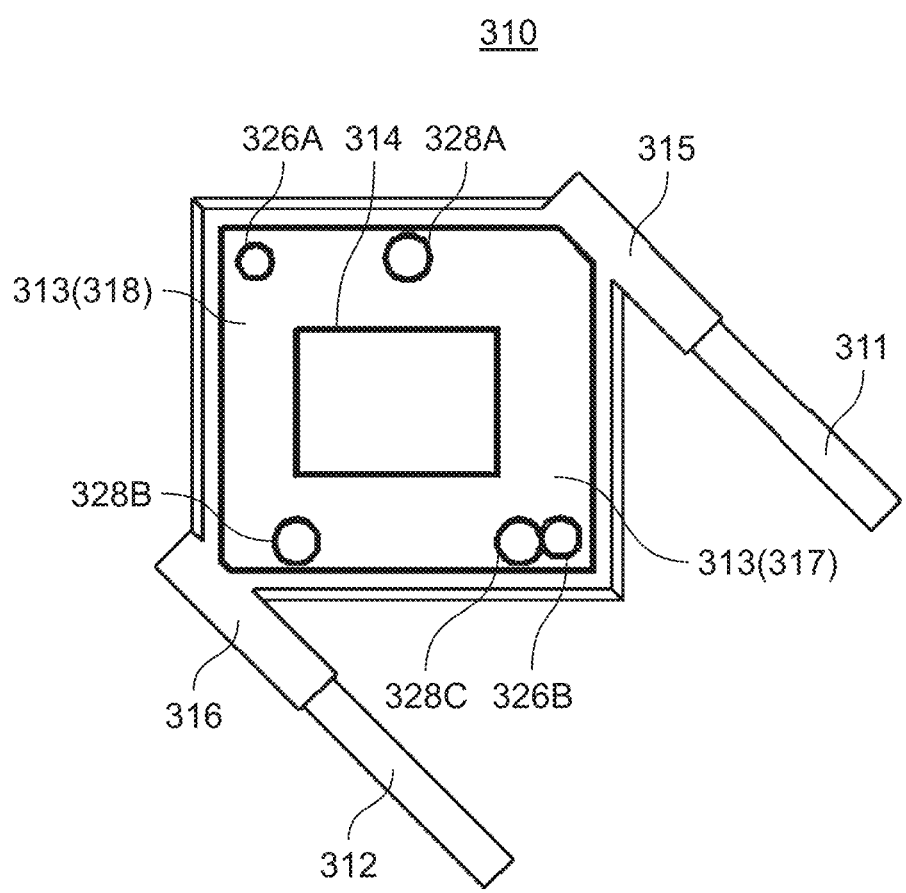
FIG. 18 is a rear view of the first heat receiving unit according to the third exemplary embodiment.
Figure 19:
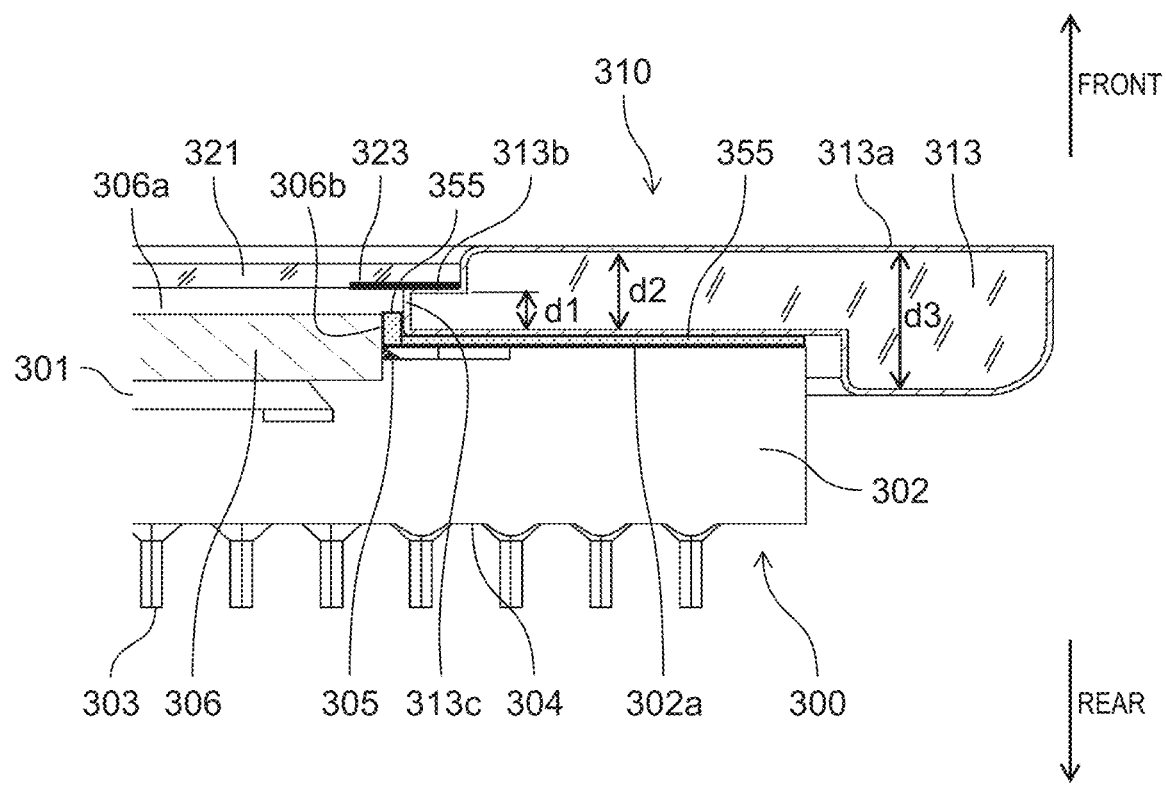
FIG. 19 is a partial cross-sectional view illustrating an arrangement of the image display element and the first heat receiving unit according to the third exemplary embodiment.

A projection display apparatus according to a third exemplary embodiment will be described with reference to FIGS. 14 to 19. The projection display apparatus according to the third exemplary embodiment differs from projection display apparatus 100 according to the first exemplary embodiment mainly in configurations of an image display element, a first heat receiving unit, and a fixing metal fitting. The other configurations are similar to those of projection display apparatus 100, and thus the same reference marks are used and detailed description thereof is omitted. FIG. 14 is a view illustrating an arrangement of image display element 300, first heat receiving unit 310, and fixing metal fitting 324 of the projection display apparatus according to the third exemplary embodiment, FIG. 15 is a perspective view of image display element 300, FIG. 16 is a cross-sectional view of image display element 300, FIG. 17A is a front view of first heat receiving unit 310, FIG. 17B is a view of the first heat receiving unit in FIG. 17A as viewed in a direction of an arrow 17B, FIG. 18 is a rear view of first heat receiving unit 310, and FIG. 19 is a partially enlarged view illustrating an arrangement of image display element 300 and first heat receiving unit 310.

Figure 15:
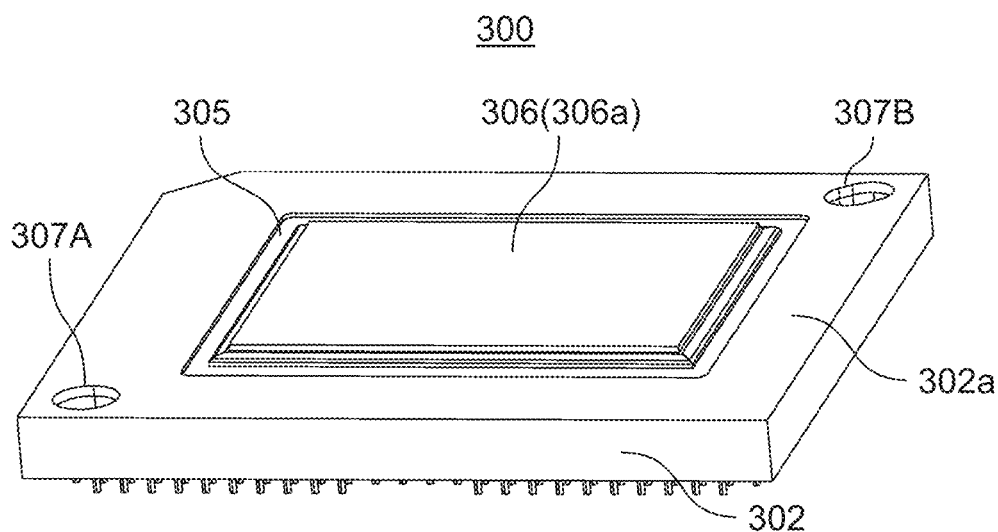
FIG. 15 is a perspective view of an image display element of the third exemplary embodiment.
Figure 16:
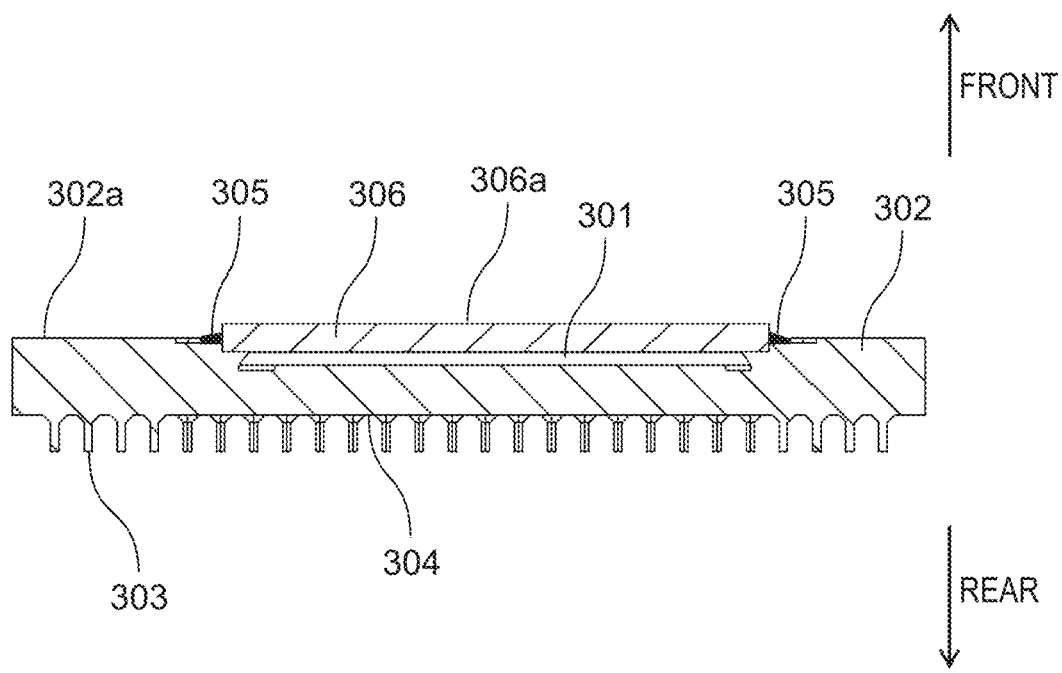
FIG. 16 is a cross-sectional view of the image display element of the third exemplary embodiment.

As illustrated in FIGS. 15 and 16, image display element 300 includes reflective image display 301 in which micromirrors that can be independently controlled from the outside are two-dimensionally arranged similarly to image display element 138, ceramic base part 302 surrounding the reflective image display, terminal part 303 provided on a back surface electrically connected to a drive board, heat dissipation part 304 provided on the back surface, and front face glass 306 that seals the inside while transmitting incident light from a light source unit. Front face glass 306 is fixed to base part 302 by filling adhesive 305 between side face 306b and base part 302.

Furthermore, base part 302 of image display element 300 has positioning holes 307A, 307B, a position in a direction parallel to front face 302a of base part 302 is fixed by positioning holes 307A, 307B, and front face 302a is pressed and fixed by pins 327A, 327B, 327C provided on the fixing metal fitting 324 (see FIG. 14).

Note that terminal part 303 of image display element 300 is electrically connected to drive board 142 via a socket as in the case of image display element 138. As in the case of projection display apparatus 100, drive board 142 is connected to a controller, and receives an external signal corresponding to image content to be displayed from the controller.

Similarly to projection display apparatus 100 according to the first exemplary embodiment, second heat receiving unit 140 is brought into contact with heat dissipation part 304 of image display element 300 via conductive grease by a pressing spring (not illustrated), and can receive driving heat of image display element 300.

As illustrated in FIGS. 17A, 17B, and 18, first heat receiving unit 310 includes first inflow pipe 311, first outflow pipe 312, rectangular flow path part 313, first joint 315, and second joint 316.

First inflow pipe 311 and first outflow pipe 312 are brazed and connected to two corners located diagonally of rectangular flow path part 313 or the vicinity thereof via first joint 315 and second joint 316, respectively. First inflow pipe 311 and first outflow pipe 312 are connected to first joint 315 and second joint 316, respectively, by bending a round pipe.

Flow path part 313 includes through holes 326A, 326B, 328A, 328B, 328C penetrating first pipe 317, second pipe 318, and flow path part 313.

First pipe 317 and second pipe 318 branch from first joint 315 and join together at second joint 316 to form rectangular flow path part 313, and form rectangular opening 314 at the center. First pipe 317 and second pipe 318 have the same length. That is, a distance from first inflow pipe 311 to first outflow pipe 312 through first pipe 317 and a distance from first inflow pipe 311 to first outflow pipe 312 through second pipe 318 are the same, and a flow rate of refrigerant Rg is divided in a well-balanced manner. Here, "the lengths are the same" includes not only a case where the lengths are completely the same but also a case where the lengths are substantially the same.

Furthermore, first pipe 317 and second pipe 318 constituting flow path part 313 are constituted by upper and lower two thin metal plates (detailed configurations of the two metal plates are omitted in FIG. 19) similarly to first pipe 173 and second pipe 174 constituting flow path part 154 of the first exemplary embodiment illustrated in FIG. 9. Also in this case, for example, flow path part 313 can be formed by assembling a metal plate made of a clad material and passing the metal plate through a heating furnace. Flow path part 313 is made of, for example, an aluminum clad material.

Similarly to the cooling device of the first exemplary embodiment illustrated in FIG. 5, the refrigerant flows into flow path part 313 from second heat receiving unit 140 through second outflow pipe 163, pipe 191, and first inflow pipe 311. The refrigerant flowing into flow path part 313 absorbs the heat of the front face of image display element 300, and the temperature rises. The refrigerant whose temperature has increased flows out of first outflow pipe 312, passes through pipe 192, and flows into radiator 150 as a heat dissipation part. The refrigerant is cooled by radiator 150, passes through pipe 193, reserve tank 151, and pipe 194, and circulates to second heat receiving unit 140 again.

As illustrated in FIG. 17B, first joint 315 is provided with face 356 facing an inflow direction of refrigerant Rg, and inflow refrigerant Rg collides with face 356. Accordingly, even when refrigerant Rg contains air, the air flows as fine bubbles, so that clogging of refrigerant Rg can be prevented. Face 356 is not limited to first joint 315, and may be provided at least until refrigerant Rg reaches flow path part 313 via first inflow pipe 311.

Rectangular opening 314 of flow path part 313 is formed in a shape larger than an outer shape of front face glass 306 of image display element 300 by about one along the outer shape of the front face glass, and is fitted into front face glass 306.

Through holes 326A, 326B, 328A, 328B, 328C provided in flow path part 313 are holes through which pins 325A, 325B, 327A, 327B, 327C provided in fixing metal fitting 324 pass, respectively. Through holes 326A, 326B, 328A, 328B, 328C penetrate flow path part 313, and two metal plates are brazed to form wall surfaces of these through holes so that the refrigerant does not leak.

As illustrated in FIG. 14, fixing metal fitting 324 includes pins 325A, 325B, 327A, 327B, 327C. Pins 325A, 325B of fixing metal fitting 324 pass through through holes 326A, 326B provided in flow path part 313 of first heat receiving unit 310, and are inserted into positioning holes 307A, 307B of image display element 300, respectively. By inserting pins 325A, 325B into positioning holes 307A, 307B, respectively, the position in the direction parallel to front face 302a of base part 302 of image display element 300 is fixed.

Pins 327A, 327B, 327C of fixing metal fitting 324 pass through through holes 328A, 328B, 328C provided in flow path part 313 of first heat receiving unit 310, respectively, and are pressed against front face 302a of image display element 300. When pins 327A, 327B, 327C are pressed against front face 302a of image display element 300, the position of image display element 300 in a front-rear direction (a traveling direction of the light modulated by reflective image display 301) is fixed.

Next, a positional relationship between image display element 300 and first heat receiving unit 310 will be described. As illustrated in FIG. 19, front face 306a of front face glass 306 of image display element 300 is parallel to front face 302a of base part 302, and protrudes more in the traveling direction (forward) of the light modulated by reflective image display 301 than front face 302a. Therefore, a part of side face 306b of front face glass 306 is exposed forward from base part 302. That is, image display element 300 has a structure in which front face 306a of front face glass 306 is located in front of front face 302a of base part 302, and front face 306a of front face glass 306 and front face 302a of base part 302 are connected by side face 306b of front face glass 306.

A part of front face glass 306 protruding forward from base part 302 is fitted into opening 314 of first heat receiving unit 310. At this time, side face 306b of front face glass 306 is in contact with inner wall part 313c of opening 314 of first heat receiving unit 310, and front face 302a of base part 302 is in contact with flow path part 313 (first pipe 317, second pipe 318) via sheet-like heat conductive member 355. Refrigerant Rg supplied to first heat receiving unit 310 is divided into two directions of first pipe 317 and second pipe 318 of flow path part 313, flows in front of front face 302a of base part 302 of image display element 300 and around side face 306b of front face glass 306, and joins at first outflow pipe 312. As a result, heat generated in image display element 300 by incidence of strong light from light source unit 101 can be transmitted to refrigerant Rg flowing through flow path part 313.

Furthermore, as illustrated in FIG. 19, in the first heat receiving unit 310, front face 313a located on the front side is provided and plane part 313b is provided on a side of opening 314 and on a side of image display element 300 with respect to front face 313a. On plane part 313b of first heat receiving unit 310, light shielding mask glass 321 is disposed in parallel to front face glass 306 with an air interval in front of front face glass 306 of image display element 300. By providing plane part 313b only in the periphery of opening 314 in this manner, light shielding mask glass 321 can be disposed close to an effective part of image display element 300 and can be configured to be small. As illustrated in FIG. 19, flow path height d1 of flow path part 313 between plane part 313b and image display element 300 is smaller than flow path height d2 of flow path part 313 between front face 313a of flow path part 313 and image display element 300. However, since light shielding mask glass 321 becomes small, flow path part 313 having flow path height d2 of a sufficient size can be secured on the outer peripheral side of plane part 313b, and the flow of the entire refrigerant is smooth. Moreover, flow path part 313 having flow path height d3 larger than flow path height d2 is formed on the outer peripheral side of image display element 300.

Furthermore, light shielding mask glass 321 includes light shielding region 323 that cuts light other than light incident on an effective part of reflective image display 301 of image display element 300 and light reflected and emitted. When light shielding region 323 absorbs light, the temperature becomes high. Therefore, it is preferable to provide a heat insulating member between plane part 313b of first heat receiving unit 310 and light shielding mask glass 321.

2. Effects and Others

As described above, the projection display apparatus according to the third exemplary embodiment includes: light source unit 101 that emits light; image display element 300 including reflective image display 301 that modulates the light from light source unit 101 according to an external signal; the cooling device that cools image display element 300; and projection lens unit 139 that enlarges and projects an image generated by the light modulated by image display element 300.

The cooling device includes first heat receiving unit 310 having rectangular opening 314 in a central part, pump 140a that sends refrigerant Rg that is liquid to first heat receiving unit 310, and radiator 150 that radiates heat received by refrigerant Rg. First heat receiving unit 310 includes first inflow pipe 311 into which refrigerant Rg flows from pump 140a, first outflow pipe 312 from which refrigerant Rg flows out, and flow path part 313 forming opening 314 and connecting first inflow pipe 311 and first outflow pipe 312.

Image display element 300 includes front face glass 306 having front face 306a (first front face) located in front of reflective image display 301, and base part 302 having front face 302a (second front face) outside front face glass 306. Front face 302a of base part 302 is parallel to front face 306a of front face glass 306 and is located behind and outside front face 306a of front face glass 306. Between front face 306a of front face glass 306 and front face 302a of base part 302, a part of side face 306b (first side face) of front face glass 306 is exposed from base part 302.

Front face 306a of front face glass 306 of image display element 300 is inserted into opening 314 of first heat receiving unit 310, and flow path part 313 of first heat receiving unit 310 is in contact with side face 306b of front face glass 306 exposed from base part 302 and front face 302a of base part 302 via heat conductive member 355. Front face 313a of flow path part 313 of first heat receiving unit 310 is positioned in front of front face 306a of front face glass 306.

First heat receiving unit 310 has face 356 facing an inflow direction of refrigerant Rg at least until refrigerant Rg reaches flow path part 313 via first inflow pipe 311, and refrigerant Rg collides with facing face 356. Accordingly, even when refrigerant Rg contains air, the air flows as fine bubbles, so that clogging of refrigerant Rg can be prevented.

Flow path part 313 of first heat receiving unit 310 has plane part 313b parallel to front face 313a, and front face 313a is located around plane part 313b and in the traveling direction of the modulated light compared to plane part 313b. That is, in the vicinity of opening 314 of first heat receiving unit 310, plane part 313b parallel to front face 313a of flow path part 313 and front face 306a of front face glass 306 is provided between them. Light shielding mask glass 321 is disposed on plane part 313b, and light shielding mask glass 321 is provided with light shielding region 323 for cutting light other than light incident on an effective part of image display element 300 and light reflected and emitted. However, plane part 313b is not necessarily required as long as flow path height d2 of flow path part 313 can be configured to be close to flow path height d1, and a support member for light shielding mask glass 321 may be separately provided on front face 313a of flow path part 313 of first heat receiving unit 310.

Flow path part 313 of first heat receiving unit 310 has a plurality of through holes 326A, 326B, 328A, 328B, 328C penetrating in the traveling direction of the modulated light. By causing pins 325A, 325B, 327A, 327B, 327C provided in fixing metal fitting 324 to pass through through holes 326A, 326B, 328A, 328B, 328C, respectively, image display element 300 can be easily positioned.

Other Exemplary Embodiments

As described above, the above exemplary embodiments have been described as examples of the techniques disclosed in the present application. However, the techniques in the present disclosure are not limited to the above exemplary embodiments, and can also be applied to exemplary embodiments in which change, substitution, addition, omission, and the like are performed. Furthermore, a new exemplary embodiment can be made by combining the components described in the above exemplary embodiments.

In the first and third exemplary embodiments, light source unit 101 generates white light from the blue laser by laser diode unit 101a, but the present invention is not limited thereto. White light may be generated by synthesizing light beams of respective colors from a red semiconductor laser, a blue semiconductor laser, and a green semiconductor laser, or a light source other than the laser such as a lamp may be used.

Figure 20:
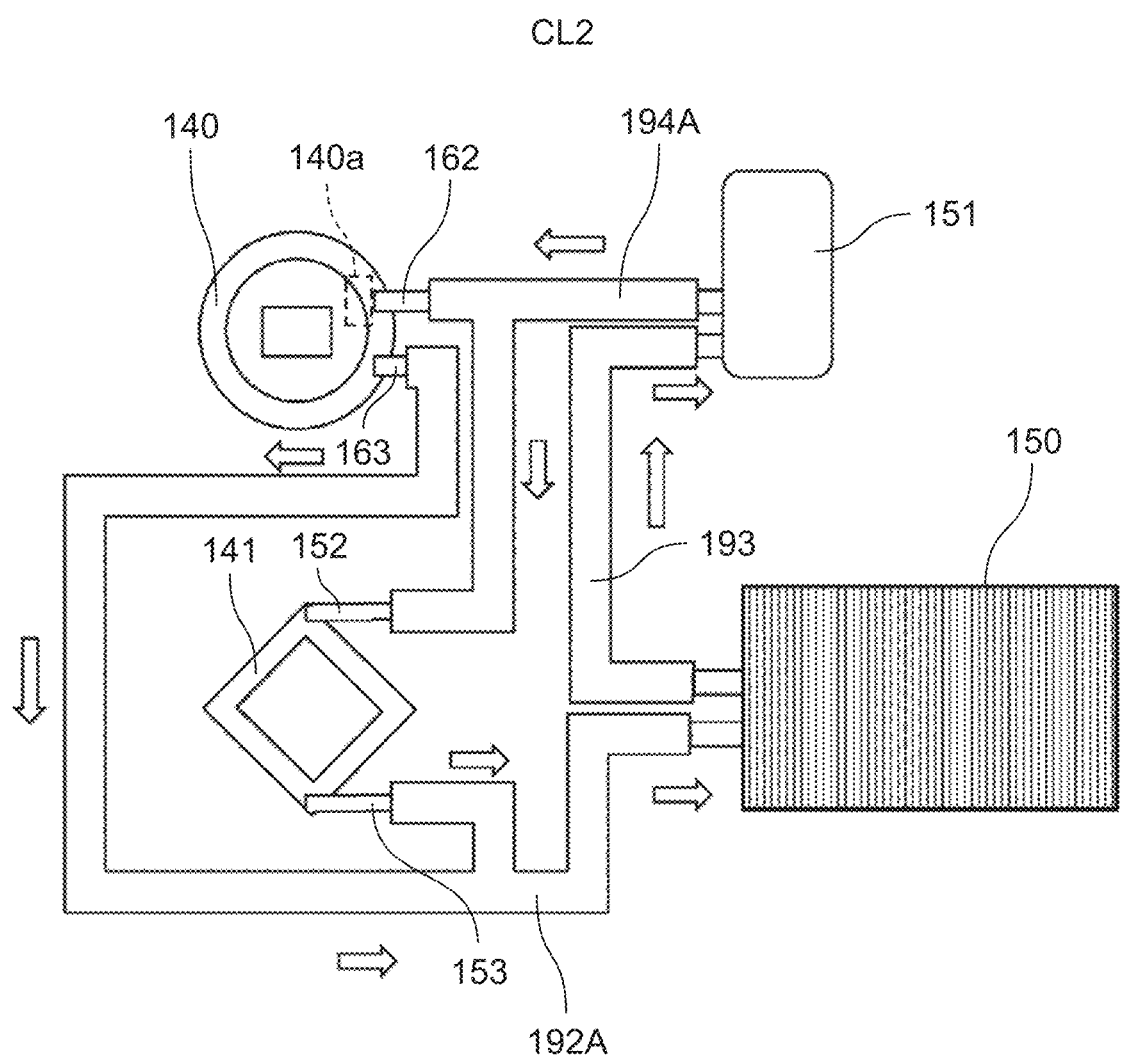
FIG. 20 is a diagram illustrating connection of a liquid-cooled module of a cooling device according to a second modification example.

In the cooling device of the first to third exemplary embodiments, refrigerant Rg flows into the first heat receiving unit and the second heat receiving unit in series, but the present invention is not limited thereto. As in cooling device CL2 of a second modification example illustrated in FIG. 20, the first heat receiving unit and the second heat receiving unit may be configured such that refrigerant Rg flows in parallel.

Figure 21:
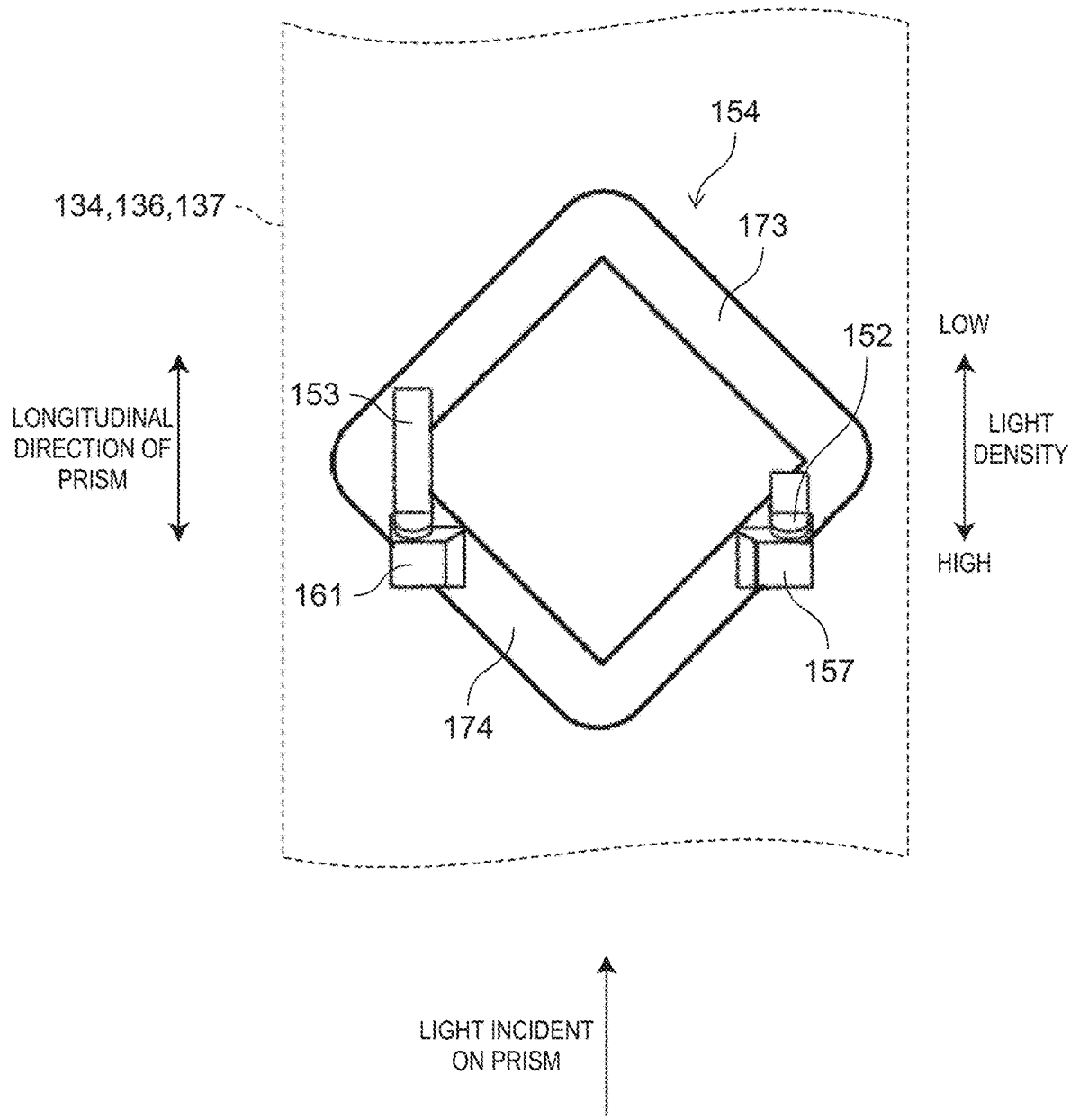
FIG. 21 is a front view of a first heat receiving unit as viewed from a prism side in a third modification example.

In the first exemplary embodiment, projection display apparatus 100 includes prism unit 132 in which a plurality of prisms 134, 136, 137 each having a triangular prism or a quadrangular prism are directly bonded to each other through an optical thin coating or fixed while an air gap is maintained on an optical path between image display element 138 and projection lens unit 139. Here, as in a third modification example illustrated in FIG. 21, first inflow pipe 152 and first outflow pipe 153 of first heat receiving unit 141 may extend in parallel to a face of flow path part 154, and may be connected to flow path part 154 so as to be eccentric (biased) to the incident side of the light to the corresponding prism of prism unit 132 with respect to a center of a rectangle formed by flow path part 154. Since first inflow pipe 152 and first outflow pipe 153 are eccentrically connected to flow path part 154 on the light incident side to prism unit 132, a path on the light incident side to prism unit 132 is shortened in flow path part 154, and the cooling efficiency on the light incident side to prism unit 132 can be increased. The same applies to first inflow pipes 152A, 311 and first outflow pipes 153A, 312 of first heat receiving units 141A, 310 of the second and third exemplary embodiments.

Figure 22:
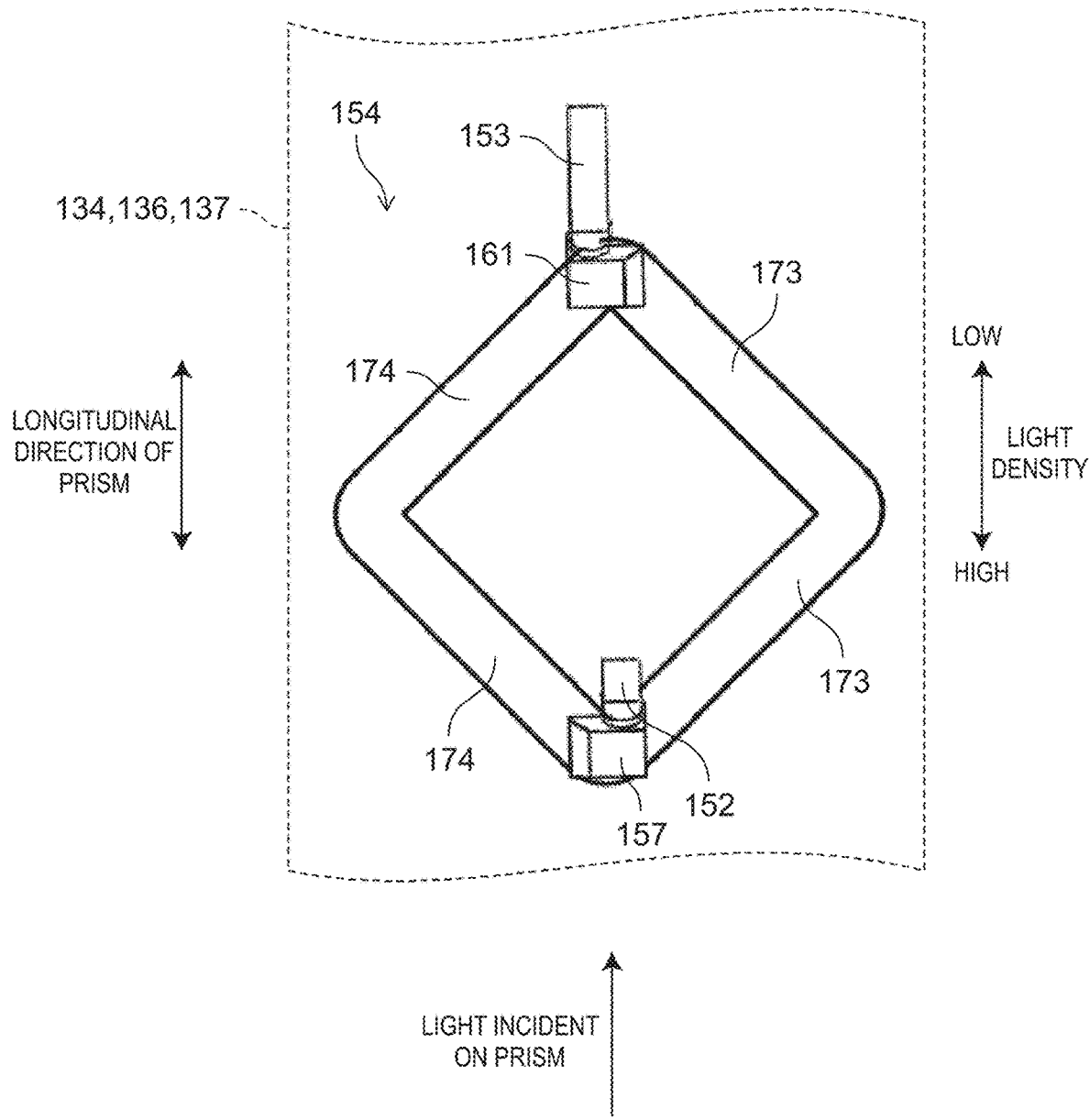
FIG. 22 is a front view of a first heat receiving unit as viewed from a prism side in a fourth modification example.

Furthermore, as in a fourth modification example illustrated in FIG. 22, first inflow pipe 152 of first heat receiving unit 141 may be connected to flow path part 154 on a side of a part having a high light density of the corresponding prism of prism unit 132, and first outflow pipe 153 may be connected to flow path part 154 on a side of a part having a low light density of the corresponding prism. Since first inflow pipe 152 of first heat receiving unit 141 is connected to flow path part 154 on the side of the part of the corresponding prism of prism unit 132 where the light density is high, refrigerant Rg can be caused to first flow into the side of protruding part 138d where the temperature is high, so that the cooling efficiency can be improved. The same applies to first inflow pipes 152A, 311 and first outflow pipes 153A, 312 of first heat receiving units 141A, 310 of the second and third exemplary embodiments.

As described above, the exemplary embodiments have been described to exemplify the techniques in the present disclosure. For that purpose, the accompanying drawings and the detailed description have been provided. Therefore, in order to illustrate the above techniques, the components illustrated in the accompanying drawings and described in the detailed description can include not only components essential for solving the problems but also components non-essential for solving the problems. Thus, it should not be immediately construed that those non-essential components are essential only based on the fact that those non-essential components are illustrated in the accompanying drawings or described in the detailed description.

The exemplary embodiments described above are intended to illustrate the technique in the present disclosure, and thus various changes, replacements, additions, eliminations, and the like may be made within the scope of claims and equivalents thereof.

Overview of Exemplary Embodiments (1) A projection display apparatus of the present disclosure includes: a light source unit that emits light; an image display element including a reflective image display that modulates the light from the light source unit according to an external signal; a cooling device that cools the image display element; and a projection lens unit that enlarges and projects an image generated by the light modulated by the image display element. The cooling device includes a first heat receiving unit including an opening that is rectangular in a central part, a pump that feeds a refrigerant that is liquid to the first heat receiving unit, and a heat dissipation part that dissipates heat received by the refrigerant. The first heat receiving unit includes a first inflow pipe into which the refrigerant flows from the pump, a first outflow pipe through which the refrigerant flows out, and a flow path part that forms the opening and connects the first inflow pipe and the first outflow pipe. The image display element includes a protruding part protruding from a periphery of the reflective image display in a direction in which the modulated light travels on a side on which the light from the light source unit is incident. The protruding part includes a first front face on a side on which the light from the light source unit is incident, a first side face extending rearward from an outer end of the first front face, and a second front face parallel to the first front face and located in a direction opposite to a direction in which the light of the first front face is incident. The protruding part of the image display element is inserted into the opening of the first heat receiving unit, and the flow path part of the first heat receiving unit is in contact with the first side face and the second front face of the protruding part via a heat conductive member. A front face of the flow path part of the first heat receiving unit is flush with the first front face of the protruding part or in front of the first front face of the protruding part.

As described above, since the flow path part of the first heat receiving unit is in contact with the first side face and the second front face of the image display element via the heat conductive member, a light incident side of the image display element can be efficiently cooled. Furthermore, in the cooling device, since the front face of the flow path part of the first heat receiving unit is located on the same face as the first front face of the image display element or in front of the first front face, even when bending R is required at a corner between the front face and an inner wall part of the flow path part, a contact area with the first side face can be sufficiently secured.

(2) The projection display apparatus of (1) includes a prism unit in which a plurality of prisms each having a triangular prism or a quadrangular prism are directly bonded via an optical thin coating or fixed while an air gap is maintained on an optical path between the image display element and the projection lens unit. The first inflow pipe and the first outflow pipe of the first heat receiving unit extend in parallel to a face formed by the flow path part, and are connected to the flow path part at a position eccentric to a light incident side to the prism unit with respect to a center of the opening formed by the flow path part.

(3) In the projection display apparatus of (1), the flow path part of the first heat receiving unit includes a first pipe and a second pipe branching from the first inflow pipe and joining at the first outflow pipe, the first pipe and the second pipe form different sides of the opening that is rectangular of the first heat receiving unit, and the first pipe and the second pipe have an identical length.

(4) The projection display apparatus of (1) or (3) includes a prism unit in which a plurality of prisms each having a triangular prism or a quadrangular prism are directly bonded via an optical thin coating or fixed while an air gap is maintained on an optical path between the image display element and the projection lens unit. The first inflow pipe of the first heat receiving unit is connected to the flow path part on a high light density side of the prism unit, and the first outflow pipe is located on a high light density side of the light from the light source unit that has entered the prism unit.

(5) In the projection display apparatus device of (2) or (4), the first inflow pipe and the first outflow pipe of the first heat receiving unit extend along a longitudinal direction of the prism of the prism unit, the prism facing the image display element.

(6) In the projection display apparatus of any one of (1) to (5), the first inflow pipe and the first outflow pipe of the first heat receiving unit extend on a face parallel to the reflective image display of the image display element on an opposite side of a direction in which incident light enters the reflective image display.

(7) In the projection display apparatus of any one of (1) to (6), the first heat receiving unit includes a face that intersects or faces an inflow direction of the refrigerant at least until the refrigerant reaches the flow path part via the first inflow pipe.

(8) In the projection display apparatus of any one of (1) to (7), at least one of the first inflow pipe and the first outflow pipe of the first heat receiving unit is connected to the flow path part via a joint.

(9) The projection display apparatus of (2) or (4) includes a second heat receiving unit that receives driving heat of the image display element, and the first heat receiving unit is disposed between the prism unit and the image display element. The image display element is disposed between the first heat receiving unit and the second heat receiving unit. The second heat receiving unit includes a second inflow pipe into which the refrigerant flows, and a second outflow pipe through which the refrigerant flows out.

(10) In the projection display apparatus of (9), the second outflow pipe and the first inflow pipe are connected in series, the refrigerant flowing out of the second outflow pipe of the second heat receiving unit reaching the first inflow pipe of the first heat receiving unit.

(11) In the projection display apparatus of (9), the first heat receiving unit and the second heat receiving unit include a configuration, the refrigerant flowing in parallel.

(12) In the projection display apparatus of any one of (1) to (11), the flow path part of the first heat receiving unit is configured of two brazed plate members, and the two brazed plate members include a mating face parallel to an inner wall part of the flow path part forming the opening.

(13) In the projection display apparatus of any one of (1) to (12), the flow path part of the first heat receiving unit is configured of two brazed metal plate members, and the two brazed plate members include a mating face extending from an outer periphery of the flow path part in a direction perpendicular to an inner wall part of the flow path part forming the opening.

(14) In the projection display apparatus of any one of (1) to (13), the reflective image display is a digital mirror device.

(15) In the projection display apparatus of any one of (1) to (14), the flow path part of the first heat receiving unit is made of an aluminum clad material.

(16) In the projection display apparatus of (1), the image display element includes a protruding part located outside the reflective image display, and the protruding part includes the first front face, the second front face, and the first side face.

(17) In the projection display apparatus of (1), the image display element further includes a front face glass positioned in front of the reflective image display, and a base part including the second front face positioned outside the front face glass, and the first front face is a front face of the front face glass, and the first side face is a side face of the front face glass.

(18) In the projection display apparatus of (1), the flow path part of the first heat receiving unit includes a plane part parallel to the front face of the flow path part, and the front face of the flow path part is located around the plane part and in front of the plane part.

(19) In the projection display apparatus of (1), the flow path part of the first heat receiving unit includes a plurality of through holes penetrating in a front-rear direction.

The present disclosure is applicable to a projection display device including an image display element having a reflective image display.

What is claimed is:

1. A projection display apparatus comprising:
a light source unit that emits light;
an image display element including a reflective image display that modulates the light from the light source unit according to an external signal;
a cooling device that cools the image display element;
a projection lens unit that enlarges and projects an image generated by the light modulated by the image display element; and
a prism unit in which a plurality of prisms are directly bonded via an optical thin coating or fixed while an air gap is maintained between the plurality of prisms and are provided on an optical path between the image display element and the projection lens unit, wherein
the cooling device includes:
a first heat receiving unit including an opening that is rectangular;
a pump that feeds a refrigerant that is liquid to the first heat receiving unit; and
a heat dissipation part that dissipates heat received by the refrigerant,
the first heat receiving unit includes:
a first inflow pipe into which the refrigerant flows;
a first outflow pipe through which the refrigerant flows out; and
a flow path part that forms the opening and connects the first inflow pipe and the first outflow pipe,
the image display element includes:
a first front face located in front of the reflective image display;
a second front face parallel to the first front face and located behind and outside the first front face; and
a first side face located between the first front face and the second front face,
the first front face of the image display element is inserted into the opening of the first heat receiving unit,
the flow path part of the first heat receiving unit is in contact with the first side face and the second front face of the image display element via a heat conductive member,
the flow path part of the first heat receiving unit includes a front face that is flush with or in front of the first front face of the image display element, and
the first inflow pipe and the first outflow pipe of the first heat receiving unit extend in parallel to a face formed by the flow path part, and are connected to the flow path part at a position eccentric to a light incident side to the prism unit with respect to a center of the opening formed by the flow path part.

2. The projection display apparatus according to claim 1, wherein
the flow path part of the first heat receiving unit includes a first pipe and a second pipe branching from the first inflow pipe and joining at the first outflow pipe,
the first pipe and the second pipe form different sides of the opening that is rectangular of the first heat receiving unit, and
the first pipe and the second pipe have an identical length.

3. The projection apparatus display apparatus according to claim 1, wherein the first inflow pipe and the first outflow pipe of the first heat receiving unit extend along a longitudinal direction of the prism of the prism unit, the prism facing the image display element.

4. The projection display apparatus according to claim 1, wherein the first inflow pipe and the first outflow pipe of the first heat receiving unit extend on a face parallel to the reflective image display of the image display element on an opposite side of a direction in which incident light enters the reflective image display.

5. The projection display apparatus according to claim 1, wherein the first heat receiving unit includes a face that intersects or faces an inflow direction of the refrigerant at least until the refrigerant reaches the flow path part via the first inflow pipe.

6. The projection display apparatus according to claim 1, wherein at least one of the first inflow pipe and the first outflow pipe of the first heat receiving unit is connected to the flow path part via a joint.

7. The projection display apparatus according to claim 1, further comprising a second heat receiving unit that receives driving heat of the image display element, wherein
the first heat receiving unit is disposed between the prism unit and the image display element,
the image display element is disposed between the first heat receiving unit and the second heat receiving unit, and
the second heat receiving unit includes:
a second inflow pipe into which the refrigerant flows; and
a second outflow pipe through which the refrigerant flows out.

8. The projection display apparatus according to claim 7, wherein the second outflow pipe and the first inflow pipe are connected in series, the refrigerant flowing out of the second outflow pipe of the second heat receiving unit reaching the first inflow pipe of the first heat receiving unit.

9. The projection display apparatus according to claim 7, wherein the first heat receiving unit and the second heat receiving unit include a configuration, the refrigerant flowing in parallel.

10. The projection display apparatus according to claim 1, wherein
the flow path part of the first heat receiving unit is configured of two brazed plate members, and the two brazed plate members include a mating face parallel to an inner wall part of the flow path part forming the opening.

11. The projection display apparatus according to claim 1, wherein
the flow path part of the first heat receiving unit is configured of two brazed metal plate members, and
the two brazed plate members include a mating face extending from an outer periphery of the flow path part in a direction perpendicular to an inner wall part of the flow path part forming the opening.

12. The projection display apparatus according to claim 1, wherein the reflective image display is a digital mirror device.

13. The projection display apparatus according to claim 1, wherein the flow path part of the first heat receiving unit is made of an aluminum clad material.

14. The projection display apparatus according to claim 1, wherein
the image display element includes a protruding part located outside the reflective image display, and
the protruding part includes the first front face, the second front face, and the first side face.

15. The projection display apparatus according to claim 1, wherein
the image display element further includes a front face glass positioned in front of the reflective image display, and a base part including the second front face positioned outside the front face glass, and
the first front face is a front face of the front face glass, and the first side face is a side face of the front face glass.

16. The projection display apparatus according to claim 1, wherein
the flow path part of the first heat receiving unit includes a plane part parallel to the front face of the flow path part, and
the front face of the flow path part is located around the plane part and in front of the plane part.

17. A projection display apparatus comprising:
a light source unit that emits light;
an image display element including a reflective image display that modulates the light from the light source unit according to an external signal;
a cooling device that cools the image display element;
a projection lens unit that enlarges and projects an image generated by the light modulated by the image display element; and
a prism unit in which a plurality of prisms are directly bonded via an optical thin coating or fixed while an air gap is maintained between the plurality of prisms and are provided on an optical path between the image display element and the projection lens unit, wherein
the cooling device includes:
a first heat receiving unit including an opening that is rectangular;
a pump that feeds a refrigerant that is liquid to the first heat receiving unit; and
a heat dissipation part that dissipates heat received by the refrigerant,
the first heat receiving unit includes:
a first inflow pipe into which the refrigerant flows;
a first outflow pipe through which the refrigerant flows out; and
a flow path part that forms the opening and connects the first inflow pipe and the first outflow pipe,
the image display element includes:

a first front face located in front of the reflective image display;
a second front face parallel to the first front face and located behind and outside the first front face; and
a first side face located between the first front face and the second front face,
the first front face of the image display element is inserted into the opening of the first heat receiving unit,
the flow path part of the first heat receiving unit is in contact with the first side face and the second front face of the image display element via a heat conductive member,
the flow path part of the first heat receiving unit includes a front face that is flush with or in front of the first front face of the image display element, and
a position where the first inflow pipe of the first heat receiving unit is connected to the flow path part is located on a side where the light from the light source unit that has entered the prism unit has a higher light density than a position where the first outflow pipe is connected to the flow path part.

18. The projection apparatus display apparatus according to claim 17, wherein the first inflow pipe and the first outflow pipe of the first heat receiving unit extend along a longitudinal direction of the prism of the prism unit, the prism facing the image display element.

19. The projection display apparatus according to claim 17, further comprising a second heat receiving unit that receives driving heat of the image display element, wherein
the first heat receiving unit is disposed between the prism unit and the image display element,
the image display element is disposed between the first heat receiving unit and the second heat receiving unit, and
the second heat receiving unit includes:
a second inflow pipe into which the refrigerant flows; and
a second outflow pipe through which the refrigerant flows out.

20. The projection display apparatus according to claim 19, wherein the second outflow pipe and the first inflow pipe are connected in series, the refrigerant flowing out of the second outflow pipe of the second heat receiving unit reaching the first inflow pipe of the first heat receiving unit.

21. The projection display apparatus according to claim 19, wherein the first heat receiving unit and the second heat receiving unit include a configuration, the refrigerant flowing in parallel.

22. A projection display apparatus comprising:
a light source unit that emits light;
an image display element including a reflective image display that modulates the light from the light source unit according to an external signal;
a cooling device that cools the image display element;
a projection lens unit that enlarges and projects an image generated by the light modulated by the image display element; and
a prism unit provided on an optical path between the image display element and the projection lens unit, wherein
the cooling device includes a first heat receiving unit including an opening,
the first heat receiving unit includes:
a first inflow pipe into which the refrigerant flows;
a first outflow pipe through which the refrigerant flows out; and
a flow path part that forms the opening and connects the first inflow pipe and the first outflow pipe, the image display element includes:
a first front face located in front of the reflective image display;
a second front face located behind and outside the first front face; and
a first side face located between the first front face and the second front face,
the first front face of the image display element is inserted into the opening of the first heat receiving unit,
the flow path part of the first heat receiving unit supports the first side face and the second front face of the image display element, and
the first inflow pipe and the first outflow pipe of the first heat receiving unit are connected to the flow path part at a position eccentric to a light incident side to the prism unit with respect to a center of the opening formed by the flow path part.

* * * * *